(12) United States Patent
Poulin et al.

(10) Patent No.: US 12,353,563 B2
(45) Date of Patent: Jul. 8, 2025

(54) SYSTEMS AND METHODS FOR ACCELERATING CYBERSECURITY ASSESSMENTS

(71) Applicant: BitSight Technologies, Inc., Boston, MA (US)

(72) Inventors: Christopher Poulin, Walpole, MA (US); Shyam Venugopal, Boston, MA (US); Vanessa Jankowski, Watkins Glen, NY (US); Kevin Amorin, Acton, MA (US); Hanan Bumpus, North Grafton, MA (US); Zhichun Ye, Sudbury, MA (US)

(73) Assignee: BitSight Technologies, Inc., Boston, MA (US)

( * ) Notice: Subject to any disclaimer, the term of this patent is extended or adjusted under 35 U.S.C. 154(b) by 67 days.

(21) Appl. No.: 17/856,217

(22) Filed: Jul. 1, 2022

(65) Prior Publication Data

US 2023/0004655 A1 Jan. 5, 2023

Related U.S. Application Data

(60) Provisional application No. 63/217,617, filed on Jul. 1, 2021.

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| 5,867,799 A | 2/1999 | Lang et al. |
| 6,016,475 A | 1/2000 | Miller et al. |
| 6,578,066 B1 | 6/2003 | Logan et al. |

(Continued)

FOREIGN PATENT DOCUMENTS

| WO | WO-2017/142694 A1 | 1/2019 |
| WO | WO-2019/023045 A1 | 1/2019 |

OTHER PUBLICATIONS

Keskin OF, Caramancion KM, Tatar I, Raza O, Tatar U. Cyber third-party risk management: A comparison of non-intrusive risk scoring reports. Electronics. May 13, 2021;10(10):1168. (Year: 2021).*

(Continued)

*Primary Examiner* — James R Turchen
(74) *Attorney, Agent, or Firm* — Goodwin Procter LLP

(57) ABSTRACT

The disclosure relates to a method of selecting a cybersecurity action plan; sending one or more questions; receiving a response to each of the one or more questions; for each question mapped to at least one risk vector rating: determining a risk score based on a weighted combination of the at least one risk vector rating and at least one weight; determining an indication of whether the question is indicative of a cybersecurity risk; and if the risk score is less than or equal to the threshold, assigning a flag to the question to indicate the question is indicative of a cybersecurity risk; and displaying an assessment report configured to show an assessment of cybersecurity risk of the affiliate.

20 Claims, 7 Drawing Sheets

(56) References Cited

U.S. PATENT DOCUMENTS

| | | |
|---|---|---|
| 6,745,150 B1 | 6/2004 | Breiman |
| 6,785,732 B1 | 8/2004 | Bates et al. |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,124,055 B2 | 10/2006 | Breiman |
| 7,194,769 B2 | 3/2007 | Lippmann et al. |
| 7,257,630 B2 | 8/2007 | Cole et al. |
| 7,290,275 B2 | 10/2007 | Baudoin et al. |
| 7,343,626 B1 | 3/2008 | Gallagher |
| 7,389,262 B1 | 6/2008 | Lange |
| 7,409,357 B2 | 8/2008 | Schaf et al. |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| 8,042,184 B1 | 10/2011 | Batenin |
| 8,056,132 B1 | 11/2011 | Chang et al. |
| D652,048 S | 1/2012 | Joseph |
| 8,150,538 B2 | 4/2012 | Dubinsky |
| 8,239,939 B2 | 8/2012 | Dunagan et al. |
| D667,022 S | 9/2012 | LoBosco et al. |
| 8,266,695 B1 | 9/2012 | Clay, IV |
| 8,321,791 B2 | 11/2012 | Dixon et al. |
| 8,359,651 B1 | 1/2013 | Wu et al. |
| 8,370,193 B2 * | 2/2013 | Saraf ............... G06Q 10/00 705/7.36 |
| 8,370,933 B1 | 2/2013 | Buckler |
| 8,370,938 B1 | 2/2013 | Daswani et al. |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| 8,533,843 B2 * | 9/2013 | Levi ............... G06Q 10/06 726/25 |
| D691,164 S | 10/2013 | Lim et al. |
| D694,252 S | 11/2013 | Helm |
| D694,253 S | 11/2013 | Helm |
| 8,578,496 B1 | 11/2013 | Krishnappa |
| 8,578,499 B1 | 11/2013 | Zhu et al. |
| 8,584,233 B1 | 11/2013 | Yang et al. |
| D696,677 S | 12/2013 | Corcoran et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,683,584 B1 | 3/2014 | Daswani et al. |
| 8,752,183 B1 | 6/2014 | Heiderich et al. |
| 8,775,402 B2 | 7/2014 | Baskerville et al. |
| 8,776,240 B1 | 7/2014 | Wu et al. |
| 8,806,646 B1 | 8/2014 | Daswani et al. |
| 8,825,662 B1 | 9/2014 | Kingman et al. |
| 8,839,432 B1 | 9/2014 | Patil |
| 8,850,570 B1 | 9/2014 | Ramzan |
| 8,898,776 B2 | 11/2014 | Molnar et al. |
| D719,969 S | 12/2014 | Ebtekar et al. |
| 8,949,988 B2 | 2/2015 | Adams et al. |
| 8,949,990 B1 | 2/2015 | Hsieh et al. |
| 8,966,639 B1 | 2/2015 | Roytman et al. |
| D727,942 S | 4/2015 | Angelides |
| 9,015,263 B2 | 4/2015 | Styler et al. |
| D730,918 S | 6/2015 | Park et al. |
| 9,049,222 B1 | 6/2015 | He et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| 9,323,930 B1 | 4/2016 | Satish |
| D756,371 S | 5/2016 | Bertnick et al. |
| D756,372 S | 5/2016 | Bertnick et al. |
| D756,392 S | 5/2016 | Yun et al. |
| D757,070 S | 5/2016 | Dziuba |
| D759,073 S | 6/2016 | Winklevoss |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,413,774 B1 | 8/2016 | Liu et al. |
| 9,420,049 B1 | 8/2016 | Talmor et al. |
| 9,424,333 B1 | 8/2016 | Bisignani et al. |
| 9,432,383 B2 | 8/2016 | Johns et al. |
| D766,952 S | 9/2016 | Gedrich et al. |
| 9,438,615 B2 | 9/2016 | Gladstone et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D774,068 S | 12/2016 | Derby et al. |
| 9,530,016 B1 | 12/2016 | Pomerantz |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,548,988 B1 | 1/2017 | Roundy et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| 9,578,048 B1 | 2/2017 | Hunt et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 | 6/2017 | Schultz et al. |
| 9,680,858 B1 | 6/2017 | Boyer et al. |
| D791,153 S | 7/2017 | Rice et al. |
| D791,166 S | 7/2017 | Sandhu et al. |
| D791,834 S | 7/2017 | Eze et al. |
| D792,427 S | 7/2017 | Weaver et al. |
| D794,666 S | 8/2017 | Havaldar et al. |
| D794,667 S | 8/2017 | Havaldar et al. |
| D795,891 S | 8/2017 | Kohan et al. |
| 9,736,019 B2 | 8/2017 | Hardison et al. |
| 9,742,796 B1 | 8/2017 | Salsamendi |
| 9,749,336 B1 | 8/2017 | Zhang et al. |
| D796,523 S | 9/2017 | Bhandari et al. |
| D797,138 S | 9/2017 | Reiter et al. |
| D801,989 S | 11/2017 | Iketsuki et al. |
| D803,237 S | 11/2017 | Wu et al. |
| 9,813,440 B1 | 11/2017 | Hoover et al. |
| 9,825,976 B1 | 11/2017 | Gomez et al. |
| 9,825,984 B1 | 11/2017 | Hoover et al. |
| D804,528 S | 12/2017 | Martin et al. |
| D806,735 S | 1/2018 | Olsen et al. |

(56) References Cited

U.S. PATENT DOCUMENTS

| | | |
|---|---|---|
| D806,737 S | 1/2018 | Chung et al. |
| D807,379 S | 1/2018 | Pahwa et al. |
| 9,880,710 B1 | 1/2018 | Mackinlay et al. |
| D809,523 S | 2/2018 | Lipka et al. |
| D809,989 S | 2/2018 | Lee et al. |
| D810,100 S | 2/2018 | Govindan Sankar Selvan et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| 9,973,524 B2 | 5/2018 | Boyer et al. |
| D819,687 S | 6/2018 | Yampolskiy et al. |
| D824,954 S | 8/2018 | Parfentieva et al. |
| 10,044,750 B2 | 8/2018 | Livshits et al. |
| D829,239 S | 9/2018 | Rehman |
| 10,079,854 B1 | 9/2018 | Scott et al. |
| 10,084,817 B2 | 9/2018 | Saher et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,242,180 B2 | 3/2019 | Haefner et al. |
| D847,147 S | 4/2019 | Wesley et al. |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| D853,413 S | 7/2019 | Hofner et al. |
| 10,339,321 B2 | 7/2019 | Tedeschi |
| 10,339,484 B2 * | 7/2019 | Pai .................. G06Q 10/0635 |
| 10,348,755 B1 | 7/2019 | Shavell et al. |
| 10,412,083 B2 | 9/2019 | Zou et al. |
| D863,335 S | 10/2019 | Hardy et al. |
| D863,345 S | 10/2019 | Hardy et al. |
| D864,219 S | 10/2019 | Farnan et al. |
| 10,453,142 B2 | 10/2019 | Mun |
| 10,469,515 B2 | 11/2019 | Helmsen et al. |
| 10,482,239 B1 | 11/2019 | Liu et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| 10,558,546 B2 | 2/2020 | Cranfill et al. |
| 10,572,945 B1 | 2/2020 | McNair |
| D880,512 S | 4/2020 | Greenwald et al. |
| 10,757,127 B2 | 8/2020 | Schultz et al. |
| D894,939 S | 9/2020 | Braica |
| 10,764,298 B1 | 9/2020 | Light et al. |
| 10,776,483 B2 | 9/2020 | Bagulho Monteiro Pereira |
| D900,145 S | 10/2020 | Malahy et al. |
| 10,796,260 B2 | 10/2020 | Brannon et al. |
| 10,805,331 B2 | 10/2020 | Boyer et al. |
| D903,693 S | 12/2020 | Li et al. |
| D905,712 S | 12/2020 | Li et al. |
| D905,730 S | 12/2020 | Newsom |
| D908,139 S | 1/2021 | Hardy et al. |
| 10,896,394 B2 * | 1/2021 | Brannon ............... G06F 21/552 |
| D910,705 S | 2/2021 | Capela et al. |
| 10,909,488 B2 | 2/2021 | Hecht et al. |
| D914,719 S | 3/2021 | Ryan et al. |
| D914,732 S | 3/2021 | Fischbach |
| 10,949,543 B1 * | 3/2021 | Bolukbas ............. G06F 21/577 |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| 11,023,585 B1 * | 6/2021 | Light .................... G06F 21/577 |
| 11,032,244 B2 | 6/2021 | Dahlberg |
| D924,901 S | 7/2021 | Garg et al. |
| D924,909 S | 7/2021 | Nasu et al. |
| D931,867 S | 9/2021 | Okumura et al. |
| 11,122,073 B1 | 9/2021 | Cai et al. |
| 11,126,723 B2 | 9/2021 | Bagulho Monteiro Pereira |
| D940,742 S | 1/2022 | Vickers et al. |
| 11,222,388 B2 | 1/2022 | Baumgartner et al. |
| D946,596 S | 3/2022 | Ahmed |
| D947,238 S | 3/2022 | Nie et al. |
| D949,884 S | 4/2022 | Capela et al. |
| 11,334,832 B2 | 5/2022 | Dumoulin et al. |
| 11,379,773 B2 | 7/2022 | Vescio |
| D960,191 S | 8/2022 | Feit et al. |
| D960,924 S | 8/2022 | Nordstrom et al. |
| 11,455,322 B2 | 9/2022 | Yang et al. |
| D971,933 S | 12/2022 | Ahmed |
| D982,604 S | 4/2023 | Pacione et al. |
| D983,820 S | 4/2023 | Dunnette et al. |
| D987,668 S | 5/2023 | Mairs et al. |
| 11,652,834 B2 | 5/2023 | Gladstone et al. |
| D991,943 S | 7/2023 | Fawcett et al. |
| 11,727,114 B2 | 8/2023 | Bagulho Monteiro Pereira |
| 11,777,976 B2 | 10/2023 | Boyer et al. |
| D1,008,289 S | 12/2023 | Yazdansepas |
| D1,010,666 S | 1/2024 | Cai |
| D1,010,677 S | 1/2024 | Clymer |
| D1,014,517 S | 2/2024 | Russell |
| 11,949,655 B2 | 4/2024 | Dahlberg |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1 | 11/2002 | Raviv et al. |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0088570 A1 | 5/2004 | Roberts et al. |
| 2004/0098375 A1 | 5/2004 | DeCarlo |
| 2004/0111358 A1 | 6/2004 | Lange et al. |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065754 A1 | 3/2005 | Schaf et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0228899 A1 | 10/2005 | Wendkos et al. |
| 2005/0234767 A1 | 10/2005 | Bolzman et al. |
| 2005/0278726 A1 | 12/2005 | Cano et al. |
| 2005/0278786 A1 | 12/2005 | Tippett et al. |
| 2006/0036335 A1 | 2/2006 | Banter et al. |
| 2006/0075490 A1 | 4/2006 | Boney et al. |
| 2006/0075494 A1 | 4/2006 | Bertman et al. |

(56) References Cited

U.S. PATENT DOCUMENTS

| | | |
|---|---|---|
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0230039 A1 | 10/2006 | Shull et al. |
| 2006/0253458 A1 | 11/2006 | Dixon et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0174915 A1 | 7/2007 | Gribble et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0097980 A1 | 4/2008 | Sullivan |
| 2008/0127338 A1 | 5/2008 | Cho et al. |
| 2008/0140495 A1 | 6/2008 | Bhamidipaty et al. |
| 2008/0140728 A1 | 6/2008 | Fraser et al. |
| 2008/0148408 A1 | 6/2008 | Kao et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0222736 A1 | 9/2008 | Boodaei et al. |
| 2008/0262895 A1 | 10/2008 | Hofmeister et al. |
| 2008/0270458 A1 | 10/2008 | Gvelesiani |
| 2009/0019525 A1 | 1/2009 | Yu et al. |
| 2009/0024663 A1 | 1/2009 | McGovern |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0094697 A1 | 4/2009 | Provos et al. |
| 2009/0125427 A1 | 5/2009 | Atwood et al. |
| 2009/0132861 A1 | 5/2009 | Costa et al. |
| 2009/0147026 A1 | 6/2009 | Buck et al. |
| 2009/0150999 A1 | 6/2009 | Dewey et al. |
| 2009/0161629 A1 | 6/2009 | Purkayastha et al. |
| 2009/0193054 A1 | 7/2009 | Karimisetty et al. |
| 2009/0204235 A1 | 8/2009 | Dubinsky |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0276835 A1 | 11/2009 | Jackson et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0024033 A1 | 1/2010 | Kang et al. |
| 2010/0042605 A1 | 2/2010 | Cheng et al. |
| 2010/0057582 A1 | 3/2010 | Arfin et al. |
| 2010/0114634 A1* | 5/2010 | Christiansen ........ G06Q 30/018 705/317 |
| 2010/0114757 A1 | 5/2010 | Jeng et al. |
| 2010/0180344 A1 | 7/2010 | Malyshev et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0235910 A1 | 9/2010 | Ku et al. |
| 2010/0251000 A1 | 9/2010 | Lyne et al. |
| 2010/0251371 A1 | 9/2010 | Brown |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0060950 A1 | 3/2011 | Waldron et al. |
| 2011/0099620 A1 | 4/2011 | Stavrou et al. |
| 2011/0106920 A1 | 5/2011 | Longo |
| 2011/0137704 A1 | 6/2011 | Mitra et al. |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0185427 A1 | 7/2011 | Aciicmez et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani et al. |
| 2011/0239294 A1 | 9/2011 | Kim et al. |
| 2011/0239300 A1 | 9/2011 | Klein et al. |
| 2011/0249002 A1 | 10/2011 | Duplessis et al. |
| 2011/0276514 A1 | 11/2011 | Kalagnanam et al. |
| 2011/0282997 A1 | 11/2011 | Prince et al. |
| 2011/0289582 A1 | 11/2011 | Kejriwal et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0079596 A1 | 3/2012 | Thomas et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1 | 8/2012 | Austin |
| 2012/0254993 A1 | 10/2012 | Sallam |
| 2012/0255021 A1 | 10/2012 | Sallam |
| 2012/0255027 A1 | 10/2012 | Kanakapura et al. |
| 2012/0290498 A1 | 11/2012 | Jones |
| 2012/0291129 A1 | 11/2012 | Shulman et al. |
| 2013/0014253 A1 | 1/2013 | Neou et al. |
| 2013/0055070 A1 | 2/2013 | Sacks et al. |
| 2013/0055386 A1 | 2/2013 | Kim et al. |
| 2013/0060351 A1 | 3/2013 | Imming et al. |
| 2013/0080341 A1 | 3/2013 | Veeramachaneni et al. |
| 2013/0080505 A1 | 3/2013 | Nielsen et al. |
| 2013/0086521 A1 | 4/2013 | Grossele et al. |
| 2013/0086681 A1 | 4/2013 | Jaroch |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0145437 A1 | 6/2013 | Zaitsev |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0238527 A1 | 9/2013 | Jones |
| 2013/0263034 A1 | 10/2013 | Bruck et al. |
| 2013/0263270 A1 | 10/2013 | Cote et al. |
| 2013/0275176 A1 | 10/2013 | Brown et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0318594 A1 | 11/2013 | Hoy et al. |
| 2013/0333038 A1 | 12/2013 | Chien |
| 2013/0345978 A1 | 12/2013 | Lush et al. |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0040747 A1 | 2/2014 | Gardenfors |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |

(56) References Cited

U.S. PATENT DOCUMENTS

| | | |
|---|---|---|
| 2014/0137254 A1 | 5/2014 | Ou et al. |
| 2014/0137257 A1 | 5/2014 | Martinez et al. |
| 2014/0146370 A1 | 5/2014 | Banner et al. |
| 2014/0173066 A1 | 6/2014 | Newton et al. |
| 2014/0173736 A1 | 6/2014 | Liu |
| 2014/0189098 A1 | 7/2014 | MaGill et al. |
| 2014/0189864 A1 | 7/2014 | Wang et al. |
| 2014/0204803 A1 | 7/2014 | Nguyen et al. |
| 2014/0206970 A1 | 7/2014 | Wesley et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283067 A1 | 9/2014 | Call et al. |
| 2014/0283068 A1 | 9/2014 | Call et al. |
| 2014/0283069 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0088783 A1 | 3/2015 | Mun |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0213259 A1 | 7/2015 | Du et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0339479 A1 | 11/2015 | Wang et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0365587 A1 | 12/2015 | Ha et al. |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0028746 A1 | 1/2016 | Tonn |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0104071 A1 | 4/2016 | Brueckner |
| 2016/0119373 A1 | 4/2016 | Fausto et al. |
| 2016/0134654 A1* | 5/2016 | Ghent ................. G06F 16/9024 707/800 |
| 2016/0140466 A1* | 5/2016 | Sidebottom ........ G06Q 10/0635 705/7.28 |
| 2016/0142419 A1 | 5/2016 | Antipa et al. |
| 2016/0142428 A1 | 5/2016 | Pastore et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0239772 A1 | 8/2016 | Dahlberg |
| 2016/0241560 A1 | 8/2016 | Reshadi et al. |
| 2016/0248797 A1 | 8/2016 | Yampolskiy et al. |
| 2016/0248800 A1 | 8/2016 | Ng et al. |
| 2016/0253500 A1 | 9/2016 | Alme et al. |
| 2016/0259945 A1 | 9/2016 | Yampolskiy et al. |
| 2016/0291860 A1 | 10/2016 | Higuchi et al. |
| 2016/0335232 A1 | 11/2016 | Born et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0359875 A1 | 12/2016 | Kim et al. |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0063923 A1 | 3/2017 | Yang et al. |
| 2017/0104783 A1 | 4/2017 | Vanunu et al. |
| 2017/0126719 A1 | 5/2017 | Mason |
| 2017/0142148 A1 | 5/2017 | Bu Er et al. |
| 2017/0161253 A1 | 6/2017 | Silver |
| 2017/0161409 A1 | 6/2017 | Martin |
| 2017/0161859 A1 | 6/2017 | Baumgartner et al. |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0277892 A1 | 9/2017 | MacDermid |
| 2017/0279843 A1 | 9/2017 | Schultz et al. |
| 2017/0289109 A1 | 10/2017 | Caragea |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0041521 A1 | 2/2018 | Zhang et al. |
| 2018/0052999 A1 | 2/2018 | Mitola, III |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0218157 A1 | 8/2018 | Price et al. |
| 2018/0219910 A1 | 8/2018 | Greenshpan et al. |
| 2018/0285414 A1 | 10/2018 | Kondiles et al. |
| 2018/0322584 A1 | 11/2018 | Crabtree et al. |
| 2018/0324201 A1 | 11/2018 | Lowry et al. |
| 2018/0332076 A1 | 11/2018 | Callahan et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2018/0375953 A1 | 12/2018 | Casassa Mont et al. |
| 2019/0034845 A1 | 1/2019 | Mo et al. |
| 2019/0052650 A1 | 2/2019 | Hu et al. |
| 2019/0065545 A1 | 2/2019 | Hazel et al. |
| 2019/0065748 A1 | 2/2019 | Foster et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0163914 A1 | 5/2019 | Steele et al. |
| 2019/0166152 A1 | 5/2019 | Steele et al. |
| 2019/0166156 A1 | 5/2019 | King-Wilson |
| 2019/0179490 A1 | 6/2019 | Barday et al. |

(56) References Cited

U.S. PATENT DOCUMENTS

| | | | |
|---|---|---|---|
| 2019/0215331 A1 | 7/2019 | Anakata et al. | |
| 2019/0238439 A1 | 8/2019 | Pugh et al. | |
| 2019/0297106 A1 | 9/2019 | Geil et al. | |
| 2019/0303574 A1 | 10/2019 | Lamay et al. | |
| 2019/0303584 A1 | 10/2019 | Yang et al. | |
| 2019/0362280 A1 | 11/2019 | Vescio | |
| 2019/0379632 A1 | 12/2019 | Dahlberg et al. | |
| 2019/0391707 A1 | 12/2019 | Ristow et al. | |
| 2019/0392252 A1 | 12/2019 | Fighel et al. | |
| 2020/0012794 A1 | 1/2020 | Saldanha et al. | |
| 2020/0053127 A1 | 2/2020 | Brotherton et al. | |
| 2020/0065213 A1 | 2/2020 | Poghosyan et al. | |
| 2020/0074084 A1 | 3/2020 | Dorrans et al. | |
| 2020/0092172 A1 | 3/2020 | Kumaran et al. | |
| 2020/0097845 A1 | 3/2020 | Shaikh et al. | |
| 2020/0104488 A1 | 4/2020 | Li et al. | |
| 2020/0106798 A1 | 4/2020 | Lin | |
| 2020/0120118 A1 | 4/2020 | Shu et al. | |
| 2020/0125734 A1 | 4/2020 | Light et al. | |
| 2020/0134175 A1 | 4/2020 | Marwah et al. | |
| 2020/0183655 A1 | 6/2020 | Barday et al. | |
| 2020/0186546 A1 | 6/2020 | Dichiu et al. | |
| 2020/0234345 A1* | 7/2020 | Matheson | G06Q 20/123 |
| 2020/0272763 A1 | 8/2020 | Brannon et al. | |
| 2020/0285737 A1 | 9/2020 | Kraus et al. | |
| 2020/0356689 A1 | 11/2020 | McEnroe et al. | |
| 2020/0356695 A1 | 11/2020 | Brannon et al. | |
| 2021/0064746 A1 | 3/2021 | Koide et al. | |
| 2021/0073377 A1 | 3/2021 | Coull et al. | |
| 2021/0089980 A1* | 3/2021 | Akey | G06Q 30/0203 |
| 2021/0241192 A1* | 8/2021 | Mullins | G06Q 10/0637 |
| 2021/0264488 A1* | 8/2021 | Barday | G06Q 50/265 |
| 2021/0297441 A1* | 9/2021 | Olalere | H04L 63/1408 |
| 2021/0312400 A1* | 10/2021 | Irimie | H04L 63/1416 |
| 2021/0314364 A1* | 10/2021 | Brannon | H04L 63/20 |
| 2021/0342785 A1 | 11/2021 | Mann et al. | |
| 2022/0083692 A1* | 3/2022 | Maduranthakam Kidambi Sridhar | H04L 9/0825 |
| 2022/0191232 A1 | 6/2022 | Cai et al. | |
| 2022/0335136 A1* | 10/2022 | Sabourin | G06F 21/577 |
| 2022/0405739 A1* | 12/2022 | Sindhu | G06Q 10/0635 |
| 2023/0030077 A1 | 2/2023 | Park et al. | |
| 2023/0308449 A1* | 9/2023 | Sirkin | H04L 63/102 |

OTHER PUBLICATIONS

U.S. Appl. No. 15/216,955 Published as: US2016/0330231, Methods for Using Organizational Behavior for Risk Ratings, filed Jul. 22, 2016.

U.S. Appl. No. 15/239,063 Published as: US2017/0093901, Security Risk Management, filed Aug. 17, 2016.

U.S. Appl. No. 16/405,121 Published as: US2019/0260791, Methods for Using Organizational Behavior for Risk Ratings, filed May 7, 2019.

U.S. Appl. No. 17/025,930, Methods for Using Organizational Behavior for Risk Ratings, filed Sep. 18, 2020.

U.S. Appl. No. 13/240,572 Published as: US2016/0205126, Information Technology Security Assessment System, filed Sep. 22, 2011.

U.S. Appl. No. 17/069,151 Published as: US/2021/0211454, Information Technology Security Assessment System, filed Oct. 13, 2020.

U.S. Appl. No. 15/044,952 Published as: US2017/0236077, Relationships Among Technology Assets and Services and the Entities Responsible for Them, filed Feb. 16, 2016.

U.S. Appl. No. 16/015,686 U.S. Pat. No. 10,425,380, Methods for Mapping IP Addresses and Domains to Organizations Using User Activity Data, filed Jun. 22, 2018.

U.S. Appl. No. 16/543,075 U.S. Pat. No. 10,554,619, Methods for Mapping IP Addresses and Domains to Organizations Using User Activity Data, filed Aug. 16, 2019.

U.S. Appl. No. 16/738,825 U.S. Pat. No. 10,893,021, Methods for Mapping IP Addresses and Domains to Organizations Using User Activity Data, filed Jan. 9, 2020.

U.S. Appl. No. 17/146,064 Published as US 2021/0218702, Methods for Mapping IP Addresses and Domains to Organizations Using User Activity Data, filed Jan. 11, 2021.

U.S. Appl. No. 16/292,956 U.S. Pat. No. 10,594,723, Correlated Risk in Cybersecurity, filed May 5, 2019.

U.S. Appl. No. 16/795,056 U.S. Pat. No. 10,931,705, Correlated Risk in Cybersecurity, filed Feb. 19, 2020.

U.S. Appl. No. 17/179,630 Published as: US2021/0176269, Correlated Risk in Cybersecurity, filed Feb. 19, 2021.

U.S. Appl. No. 16/688,647 U.S. Pat. No. 10,776,483, Systems and Methods for Remote Detection of Software Through Browser Webinjects, filed Nov. 19, 2019.

U.S. Appl. No. 17/000,135 U.S. Pat. No. 11,126,723, Systems and Methods for Remote Detection of Software Through Browser Webinjects, filed Aug. 21, 2020.

U.S. Appl. No. 17/401,683 Published as US 2021/0374243, Systems and Methods for Remote Detection of Software Through Browser Webinjects, filed Aug. 13, 2021.

U.S. Appl. No. 15/954,921 U.S. Pat. No. 10,812,520, Systems and Methods for External Detection of Misconfigured Systems, filed Apr. 17, 2018.

U.S. Appl. No. 17/014,495 Published as: US2020/0404017, Systems and Methods for External Detection of Misconfigured Systems, filed Sep. 8, 2020.

U.S. Appl. No. 16/549,764 Published as: US2021/0058421, Systems and Methods for Inferring Entity Relationships via Network Communications of Users or User Devices, filed Aug. 23, 2019.

U.S. Appl. No. 16/360,641 U.S. Pat. No. 11,200,323, Systems and Methods for Forecasting Cybersecurity Ratings Based on Event-Rate Scenarios, filed Mar. 21, 2019.

U.S. Appl. No. 17/523,166 Published as US 2022/0121753, Systems and Methods for Forecasting Cybersecurity Ratings Based on Event-Rate Scenarios, filed Nov. 10, 2021.

U.S. Appl. No. 16/922,672 U.S. Pat. No. 11,030,325, Systems and Methods for Generating Security Improvement Plans for Entities, filed Jul. 7, 2020.

U.S. Appl. No. 17/307,577 Published as: US2021/0326449, Systems and Methods for Generating Security Improvement Plans for Entities, filed May 4, 2021.

U.S. Appl. No. 29/677,306 U.S. Pat. No. D. 905,702, Computer Display With Corporate Hierarchy Graphical User Interface Computer Display With Corporate Hierarchy Graphical User Interface, filed Jan. 18, 2019.

U.S. Appl. No. 17/132,512 Published as US 2021/0243221, Systems and Methods for Rapidly Generating Security Ratings, filed Dec. 23, 2020.

U.S. Appl. No. 29/815,855, Computer Display With a Graphical User Interface for Cybersecurity Risk Management, filed Nov. 17, 2021.

U.S. Appl. No. 17/392,521 Published as US 2022/0191232, Systems and Methods for Cybersecurity Risk Mitigation and Management, filed Aug. 3, 2021.

U.S. Appl. No. 16/942,452 U.S. Pat. No. 11,265,330, Systems and Methods for Improving a Security Profile of an Entity Based on Peer Security Profiles, filed Jul. 29, 2020.

U.S. Appl. No. 17/320,997 Published as US 2021/0344647, Systems and Methods for Determining Asset Importance in Security Risk Management, filed May 14, 2021.

U.S. Appl. No. 17/236,594 Published as US 2021/0374246, Systems and Methods for Managing Cybersecurity Alerts, filed Apr. 21, 2021.

U.S. Appl. No. 17/710,168, Systems and Methods for Assessing Cybersecurity Risk in a Work From Home Environment, filed Mar. 31, 2022.

U.S. Appl. No. 17/945,337, Systems and Methods for Precomputation of Digital Asset Inventories, filed Sep. 15, 2022.

"Agreed Upon Procedures," Version 4.0, BITS, The Financial Institution Shared Assessments Program, Assessment Guide, Sep. 2008, 56 pages.

"Amazon Mechanical Turk," accessed on the internet at https://www.mturk.com/; 7 pages.

(56) References Cited

OTHER PUBLICATIONS

"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Master Security Criteria," Version 3.0, BITS Financial Services Security Laboratory, Oct. 2001, 47 pages.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV06EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.ll.miL.edufpublicationsflabnotesfpluggingtherightho! . . . , 2 pages.
"Rapid7 Nexpose Vulnerability Scanner," accessed on the internet at https://www.rapid7.com/products/nexpose/download/, 3 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Application as filed, transaction history and pending claims of U.S. Appl. No. 13/240,572 as of Nov. 18, 2015, 45 pages.
Artz, Michael Lyle, "NetSPA: A Network Security Planning Architecture," Massachusetts Institute of Technology, May 24, 2002, 97 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.

Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Camelo, "Botnet Cluster Identification," Sep. 2014, 90 pages.
Camelo, "Condenser: A Graph-based Approach for Detecting Botnets," AnubisNetworks R&D, Amadora, Portugal and CENTRIA, Universidade NOVA de Lisboa, Portugal (pp. 8) Oct. 31, 2014.
Carstens, et al., "Modeling Company Risk and Importance in Supply Graphs," European Semantic Web Conference 2017: The Semantic Web pp. 18-31.
Chernyshev, M. et al., "On 802.11 Access Point Locatability and Named Entity Recognition in Service Set Identifiers", IEEE Trans. on Info. and Sec., vol. 11 No. 3 (Mar. 2016).
Chu, Matthew, et al., "Visualizing Attack Graphs, Reachability, and Trust Relationships with NAVIGATOR," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph—Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gephi (gephi.org), accessed on the internet at https://web.archive.org/web/20151216223216/https://gephi.org/; Dec. 16, 2015; 1 page.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.

(56) References Cited

OTHER PUBLICATIONS

Jin et al, "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber= 1258471 (Year: 2003).
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
MaxMind, https://www.maxmind.com/en/about-maxmind, https://www.maxmind.com/en/geoip2-isp-database, date accessed Sep. 28, 20116, 3 pages.
McNab, "Network Security Assessment," copyright 2004, 13 pages.
McNab, "Network Security Assessment," copyright 2004, 56 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Morningstar Direct, dated to Nov. 12, 202, morningstardirect.com [online]. Retrieved Feb. 26, 2021 from internet <URL:https://web.archive.org/web/20201112021943/https://www.morningstar.com/products/direct> (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
Transaction history and pending claims for U.S. Appl. No. 14/021,585, as of Apr. 29, 2016, 2 pages.
Transaction history and Pending claims for U.S. Appl. No. 14/021,585, as of Nov. 18, 2015, 6 pages.
Transaction history of U.S. Appl. No. 13/240,572 and pending claims as of Mar. 22, 2016, 10 pages.
Transaction history of U.S. Appl. No. 13/240,572 as of Oct. 7, 2015, application as filed and pending claims, 45 pages.
Transaction history of U.S. Appl. No. 14/021,585 and pending claims as of Mar. 22, 2016, 2 pages.
Transaction history of U.S. Appl. No. 14/021,585 as of Oct. 7, 2015 and application as filed, 70 pages.
Transaction history of U.S. Appl. No. 14/944,484 and pending claims as of Mar. 22, 2016, 4 pages.
Transaction history of U.S. Appl. No. 61/386,156 as of Oct. 7, 2015. 2 pages.
Transaction history, application as filed and pending claims for U.S. Appl. No. 13/240,572 as of Apr. 29, 2016, 46 pages.
Transaction history, application as filed and pending claims for U.S. Appl. No. 14/944,484 as of Apr. 29, 2016, 4 pages.
Paxson, Vern, "How The Pursuit of Truth Led Me To Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost In the Browser Analysis of Web-based Malware", 2007 (9 pages).
Rare Events, Oct. 2009, JASON, The MITRE Corporation, Oct. 2009, 104 pages.
Rees, L. P. et al., "Decision support for cybersecurity risk planning." Decision Support Systems 51.3 (2011): pp. 493-505.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
Santos, J. R. et al., "A framework for linking cybersecurity metrics to the modeling of macroeconomic interdependencies." Risk Analysis: An International Journal (2007) 27.5, pp. 1283-1297.
SBIR Phase I: Enterprise Cyber Security Scoring, CyberAnalytix, LLC, http://www.nsf.gov/awardsearch/showAward.do?AwardNumber=1013603, Apr. 28, 2010, 2 pages.
Search Query Report form IP.com (performed Apr. 27, 2020).
Search Query Report from IP.com (performed Jul. 29, 2022).
Security Warrior, Cyrus Peikari, Anton, Chapter 8: Reconnaissance, 6 pages.
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 15, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.

(56) References Cited

OTHER PUBLICATIONS

Williams, Leevar, et al., "An Interactive Attack Graph Cascade and Reachability Display," MIT Lincoln Laboratory, 17 pages.

Williams, Leevar, et al., "GARNET: A Graphical Attack Graph and Reachability Network Evaluation Tool," MIT Lincoln Library, VizSEC 2009, pp. 44-59.

Winship, C., "Models for sample selection bias", Annual review of sociology, 18(1) (Aug. 1992), pp. 327-350.

U.S. Appl. No. 15/142,677 U.S. Pat. No. 9,830,569 Published as: US2016/0239772, Security Assessment Using Service Provider Digital Asset Information, filed Apr. 29, 2016.

U.S. Appl. No. 29/598,298 U.S. Pat. No. D. 835,631, Computer Display Screen With Graphical User Interface, filed Mar. 24, 2017.

U.S. Appl. No. 29/598,299 U.S. Pat. No. D. 818,475, Computer Display With Security Ratings Graphical User Interface, filed Mar. 24, 2017.

U.S. Appl. No. 29/599,622 U.S. Pat. No. D. 847,169, Computer Display With Security Ratings Graphical User Interface, filed Apr. 5, 2017.

U.S. Appl. No. 29/599,620 U.S. Pat. No. D. 846,562, Computer Display With Security Ratings Graphical User Interface, filed Apr. 5, 2017.

U.S. Appl. No. 16/543,075 U.S. Pat. No. 10,554,619 Published as: US Published as: US2019/0379632, Methods for Mapping IP Addresses and Domains to Organizations Using User Activity Data, filed Aug. 16, 2019.

U.S. Appl. No. 16/688,647 U.S. Pat. No. 10,931,705 Published as: US2020/0195681, Correlated Risk in Cybersecurity, filed Feb. 19, 2020.

U.S. Appl. No. 16/688,647 U.S. Pat. No. 11,770,401 Published as: US2021/0176269, Correlated Risk in Cybersecurity, filed Feb. 19, 2020.

U.S. Appl. No. 16/688,647 Published as: US2023/0396644, Correlated Risk in Cybersecurity, filed Aug. 4, 2023.

U.S. Appl. No. 16/688,647 U.S. Pat. No. 10,521,583, Systems and Methods for Remote Detection of Software Through Browser Webinjects, filed Oct. 25, 2018.

U.S. Appl. No. 16/688,647 U.S. Pat. No. 10,776,483 Published as: US2020/0134174, Systems and Methods for Remote Detection of Software Through Browser Webinjects, Nov. 19, 2019.

U.S. Appl. No. 17/401,683 U.S. Pat. No. 11,126,723 Published as: US2021/0004457, Systems and Methods for Remote Detection of Software Through Browser Webinjects, filed Aug. 21, 2020.

U.S. Appl. No. 29/666,942 U.S. Pat. No. D. 892,135, Computer Display With Graphical User Interface, filed Oct. 17, 2018.

U.S. Appl. No. 29/677,306 U.S. Pat. No. D. 905,702, Computer Display Screen With Corporate Hierarchy Graphical User Interface, filed Jan. 18, 2019.

U.S. Appl. No. 16/779,437 U.S. Pat. No. 10,893,067 Published as: US2021/0243221, Systems and Methods for Rapidly Generating Security Ratings, filed Jan. 31, 2020.

U.S. Appl. No. 17/132,512 U.S. Pat. No. 11,595,427 Published as: US2021/0243221, Systems and Methods for Rapidly Generating Security Ratings, filed Dec. 23, 2020.

U.S. Appl. No. 18/158,594 U.S. Pat. No. 11,777,983, Systems and Methods for Rapidly Generating Security Ratings, filed Jan. 24, 2023.

U.S. Appl. No. 29/815,855 U.S. Pat. No. D. 1,010,666, Computer Display With a Graphical User Interface for Cybersecurity Risk Management, filed Nov. 17, 2021.

U.S. Appl. No. 18/141,654 Published as: US2023/0269265, Systems and Methods for Cybersecurity Risk Mitigation and Management, filed May 1, 2023.

U.S. Appl. No. 16/802,232 U.S. Pat. No. 10,764,298, Systems and Methods for Improving a Security Profile of an Entity Based on Peer Security Profiles, filed Feb. 26, 2020.

U.S. Appl. No. 16/942,452 U.S. Pat. No. 11,265,330 Published as: US2021/0266324, Systems and Methods for Improving a Security Profile of an Entity Based on Peer Security Profiles, filed 29, 2020.

U.S. Appl. No. 29/736,641 U.S. Pat. No. D. 937,870, Computer Display With Peer Analytics Graphical User Interface, filed Jun. 2, 2020.

U.S. Appl. No. 18/422,470 Published as: US2024/0163252, Systems and Methods for Determining Asset Importance in Security Risk Management, filed Jan. 25, 2024.

U.S. Appl. No. 17/236,594 U.S. Pat. No. 11,720,679 Published as: US2021/0374246, Systems and Methods for Managing Cybersecurity Alerts, filed 21, 2021.

U.S. Appl. No. 18/335,384 U.S. Pat. No. 12,099,608 Published as: US2023/0325505, Systems and Methods for Managing Cybersecurity Alerts, filed Jun. 15, 2023.

U.S. Appl. No. 17/710,168 Published as: US2022/0318400, Systems and Methods for Assessing Cybersecurity Risk in a Work From Home Environment, filed Mar. 31, 2022.

U.S. Appl. No. 18/770,949 Published as: US2024/0362342, Systems and Methods for Assessing Cybersecurity Risk in a Work From Home Environment, filed Jul. 12, 2024.

U.S. Appl. No. 17/945,337 Published as US2023/0091953, Systems and Methods for Precomputation of Digital Asset Inventories, filed Sep. 15, 2022.

U.S. Appl. No. 18/359,183 Published as: US2024/0045950, Systems and Methods for Assessing Cybersecurity Efficacy of Entities Against Common Control And Maturity Frameworks Using Externally-Observed Datasets, filed Jul. 26, 2023.

U.S. Appl. No. 18/162,154 Published as: US2023/0244794, Systems and Methods for Assessment of Cyber Resilience, filed Jan. 31, 2023.

"Maltego 3 GUI user guide," 11 pages, Nov. 22, 2010 retrieved from Internet Archive Wayback Machine, https://web.archive.org/web/20101122112311/http://www.paterva.com:80/web5/documentation/Maltego3_crash_course.pdf on Aug. 30, 2024.

"User guide—Addendum to guide for Maltego 3.0.2," 20 pages, Nov. 23, 2010 retrieved from Internet Archive Wayback Machine, https://web.archive.org/web/20101123012539/http://www.paterva.com:80/web5/documentation/3.0.2.addendum.pdf on Aug. 30, 2024.

'834 Patent Claim Chart, *BitSight Technologies, Inc. v. NormShield Inc. d/b/a Black Kite Inc.*, Case No. 1:23-cv-12055-MJJ, D.I. 39-11 (Dec. 11, 2023), 28 pages.

"Maltego User Guide" webpage http://ctas.paterva.com/view/Userguide, 35 pages, Jun. 6, 2012, retrieved from Internet Archive Wayback Machine https://web.archive.org/web/20120606172056/http://ctas.paterva.com/view/Userguide on Sep. 6, 2024.

"MW Metadata", webpage https://mattw.io/youtube-metadata, 7 pages, retrieved on Aug. 21, 2024.

Anderson, H., "Nessus, Part 3: Analysing Reports," webpage http://www.securityfocus.com/infocus/1759, 5 pages, Oct. 20, 2006, retrieved from Internet Archive Wayback Machine https://web.archive.org/web/20061020202310/http://www.securityfocus.com/infocus/1759 on Aug. 16, 2024.

Aug. 29, 2024 Email from Melissa Nezhnik, 3 pages.

Curriculum Vitae of Kevin Almeroth Ph.D., 40 pages.

Declaration of Dr. Kevin Almeroth, 109 pages.

Declaration of Dr. Kevin Almeroth, 95 pages.

Declaration of Kevin Almeroth, Ph.D., 127 pages.

Declaration of Kevin Almeroth, Ph.D., 131 pages.

Declaration of Kevin C. Almeroth, PH.D. in support of Petition for Inter Partes Review of U.S. Pat. No. 11,777,976, 79 pages.

Declaration of Nathaniel Frank-White, 50 pages.

Declaration of Nathaniel Frank-White, 52 pages.

Declaration of Sylvia Hall-Ellis, Ph.D., 548 pages.

Gates, C., "New School Information Gathering," (2008), available at https://www.carnal0wnage.com/papers/17_Gates.pdf, 84 pages.

Gates, C., "Toorcon X Gates: New School Information Gathering," 2 pages, Mar. 2, 2009, retrieved from Internet Archive Wayback Machine https://web.archive.org/web/20090302045813/vimeo.com//2745624 on Aug. 13, 2024.

Gates, C., "Toorcon X Gates: New School Information Gathering," available at http://vimeo.com/2745624, 2 pages, retrieved on Aug. 13, 2024.

Khalil, J. et al., "Discovering Malicious Domains through Passive DNS Data Graph Analysis," Conference Paper, (Jun. 2016), 13 pages.

(56) References Cited

OTHER PUBLICATIONS

Knowles, D. et al., "W32.Blaster.Worm: Technical Details" webpage http://www.symantec.com/security_response/writeup.jsp?docid=2003-081113-0229-99&tabid=2, 3 pages, May 3, 2007, retrieved from Internet Archive Wayback Machine https://web.archive.org/web/20070503023514/http://www.symantec.com/security_response/writeup.jsp?docid=2003-081113-0229-99&tabid=2 on Aug. 16, 2024.
Levy, E., "The Making of a Spam Zombie Army," IEEE Computer & Security (2003), pp. 58-59.
Long, J., "Google Hacking for Penetration Testers," 170 pages, Jan. 31, 2006, retrieved from Internet Archive Wayback Machine, https://web.archive.org/web/20060131095431/http://www.blackhat.com/presentations/bh-europe-05/BH_EU_05-Long.pdf on Aug. 30, 2024.
Martorella, C., "A fresh new look into Information Gathering," 68 pages, Dec. 29, 2009 retrieved from Internet Archive Wayback Machine, https://web.archive.org/web/20091229020339/http://www.edgesecurity.com/docs/OWASP-Christian_Martorella-InformationGathering.pdf on Aug. 30, 2024.
Matta Security Limited, "An Introduction to Internet Attack & Penetration," available at http://www.trustmatta.com/downloads/pdf/, Matta_Attack_and_Penetration_Introduction.pdf, (2001-2002), 14 pages.
McNab, C., "Network Security Assessment," O'Reilly Media, Inc., Second Edition, (2008), 506 pages.
Moore & Valsmith, et al., "Tactical Exploitation," 37 pages, Feb. 8, 2010, retrieved from Internet Archive Wayback Machine https://web.archive.org/web/20100208161237/https:/www.blackhat.com/presentations/bh-usa-07/Moore_and_Valsmith/Whitepaper/bh-USA-07-moore_and_valsmith-WP.pdf.
Nessus, "Documentation," webpage http://www.nessus.org/documentation/, 2 pages, Feb. 19, 2007, retrieved from Internet Archive Wayback Machine https://web.archive.org/web/20070219213924/http://www.nessus.org/documentation/ on Aug. 16, 2024.
Nessus, "Plugins: Symantec Anti Virus Corporate Edition Check," webpage http://www.nessus.org/plugins/index.php?view=single&id=21725, 2 pages, Feb. 22, 2007, retrieved from Internet Archive Wayback Machine https://web.archive.org/web/20070222133717/http://www.nessus.org/plugins/index.php?view=single&id=21725 on Aug. 13, 2024.
Nessus, "Plugins: The remote host is infected by a virus", webpage http://www.nessus.org/plugins/index.php?view=single&id=11329, 2 pages, Feb. 22, 2007, retrieved from Internet Archive Wayback Machine https://web.archive.org/web/20070222091638/http://www.nessus.org/plugins/index.php?view=single&id=11329 on Aug. 13, 2024.
Nessus, "Plugins: The remote host is infected by msblast.exe", webpage http://www.nessus.org/plugins/index.php?view=single&id=11818, 1 page, Sep. 24, 2006, retrieved from Internet Archive Wayback Machine https://web.archive.org/web/20060924205758/http://www.nessus.org/plugins/index.php?view=single&id=11818 on Aug. 13, 2024.
Prosecution History for U.S. Pat. No. 10,805,331, 1060 pages.
Prosecution History for U.S. Pat. No. 11,652,834, 344 pages.
Prosecution History for U.S. Pat. No. 11,777,976, 651 pages.
Prosecution History for U.S. Pat. No. 9,438,615, 232 pages.
Prosecution History for U.S. Pat. No. 9,973,524, 424 pages.
Representative Sample. Julie Young, Investopedia. Published Apr. 10, 2019 (Web Archive Aug. 19, 2019). Accessed on Aug. 19, 2024. [https://web.archive.org/web/20190819095403/https://www.investopedia.com/terms/r/representative-sample.asp].
Social-Engineer, LLC, "Social Engineering Using Maltego," webpage <www.youtube.com/watch?v=qiv4-wy3mxo>, 2 pages, Sep. 14, 2009, retrieved on Aug. 13, 2024.
Social-Engineer, LLC, Screen captures from "Social Engineering Using Maltego," webpage <www.youtube.com/watch?v=qiv4-wy3mxo>, 43 pages, Sep. 14, 2009.
Stoneburner, G. et al., "Risk Management Guide for Information Technology Systems," NIST, available at https://www.archives.gov/files/era/recompete/sp800-30.pdf, (Jul. 2002), 55 pages.
Tenable Network Security, Inc., "Nessus 3.0 Client Guide," available at http://nessus.org/documentation/nessus_3.0_client_guide.pdf, Mar. 6, 2007, 32 pages.
U.S. Appl. No. 15/271,655 Published as: US 2018/0083999, Self-Published Security Risk Management, filed Sep. 21, 2016.
U.S. Appl. No. 15/377,574 U.S. Pat. No. 9,705,932, Methods and Systems for Creating, De-Duplicating and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 U.S. Pat. No. 10,326,786 Published as: US 2016/0330231, Methods for Using Organizational Behavior for Risk Ratings, filed Jul. 22, 2016.
U.S. Appl. No. 15/239,063 U.S. Pat No. 10,341,370 Published as: US2017/0093901, Security Risk Management, filed Aug. 17, 2016.
U.S. Appl. No. 16/405,121 U.S. Pat. No. 10,785,245 Published as: US2019/0260791, Methods for Using Organizational Behavior for Risk Ratings, filed May 7, 2019.
U.S. Appl. No. 17/025,930 U.S. Pat. No. 11,652,834 Published as: US2021/0006581, Methods for Using Organizational Behavior for Risk Ratings, filed Sep. 18, 2020.
U.S. Appl. No. 18/297,863 Published as: US2023/0247041, Methods for Using Organizational Behavior for Risk Ratings, filed Apr. 10, 2023.
U.S. Appl. No. 13/240,572 U.S. Pat. No. 10,805,331 Published as: US2016/0205126, Information Technology Security Assessment System, filed Sep. 22, 2011.
U.S. Appl. No. 14/944,484, U.S. Pat. No. 9,973,524 Published as: US2016/0323308, Information Technology Security Assessment System, filed Nov. 18, 2015.
U.S. Appl. No. 17/069,151 U.S. Pat. No. 11,777,976 Published as: US2021/0211454, Information Technology Security Assessment System, filed Oct. 13, 2020.
U.S. Appl. No. 18/453,488, U.S. Pat. No. 12,010,137 Published as: US2023/0403295, Information Technology Security Assessment System, filed Aug. 22, 2023.
U.S. Appl. No. 18/461,087 U.S. Pat. No. 11,882,146 Published as: US2023/0421600, Information Technology Security Assessment System, filed Sep. 5, 2023.
U.S. Appl. No. 18/637,577, Information Technology Security Assessment System, filed Apr. 17, 2024.
U.S. Appl. No. 15/142,677 U.S. Pat. No. 9,830,569 Published as: US2016/02397472, Security Assessment Using Service Provider Digital Assett Information, filed Apr. 29, 2016.
U.S. Appl. No. 15/134,845 U.S. Pat No. 9,680,858, Annotation Platform for a Security Risk System, filed Apr. 21, 2016.
U.S. Appl. No. 15/044,952 U.S. Pat. No. 11,182,720 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 D.835,631, Computer Display Screen with Graphic User Interface, filed Mar. 24, 2017.
U.S. Appl. No. 29/598,299 D.818,475, Computer Display with Security Ratings Graphical User Interface, filed Mar. 24, 2017.
U.S. Appl. No. 29/599,622 D.847,169, Computer Display with Security Ratings Graphical User Interface, filed Apr. 5, 2017.
U.S. Appl. No. 29/599,620 D.846,562, Computer Display with Security Ratings Graphical User Interface, filed Apr. 5, 2017.
U.S. Appl. No. 16/015,686 U.S. Pat. No. 10,425,380 Published as: US2018/0375822, Methods for Mapping IP Addresses and Domains to Organizations Using User Activity Data, filed Jun. 22, 2018.
U.S. Appl. No. 16/543,075 U.S. Pat. No. 10,554,649 Published as: US2019/0379632, Methods for Mapping IP Addresses and Domains to Organizations Using User Activity Data, filed Aug. 16, 2019.
U.S. Appl. No. 16/738,825 U.S. Pat. No. 10,893,021 Published as: US2020/0153787, Methods for Mapping IP Addresses and Domains to Organizations Using User Activity Data, filed Jan. 9, 2020.
U.S. Appl. No. 17/146,064 U.S. Pat. No. 11,627,109 Published as: US2021/0218702, Methods for Mapping IP Addresses and Domains to Organizations Using User Activity Data, filed Jan. 11, 2021.

(56) References Cited

OTHER PUBLICATIONS

U.S. Appl. No. 15/918,286 U.S. Pat. No. 10,257,219, Correlated Risk in Cybersecurity, filed Mar. 12, 2018.
U.S. Appl. No. 16/292,956 U.S. Pat. No. 10,594,723 Published as: US2019/0297106, Correlated Risk in Cybersecurity, filed Mar. 5, 2019.
U.S. Appl. No. 16/795,056 U.S. Pat. No. 10,931,705 Published as: US2020/0195681, Correlated Risk in Cybersecurity, filed Feb. 19, 2020.
U.S. Appl. No. 17/179,630 U.S. Pat. No. 11,770,401 Published as: US2021/0176269, Correlated Risk in Cybersecurity, filed Feb. 19, 2021.
U.S. Appl. No. 18/365,384 Published as: US2023/0396644, Correlated Risk in Cybersecurity, filed Aug. 4, 2023.
U.S. Appl. No. 16/170,680 U.S. Pat. No. 10,521,583, Systems and Methods for Remote Detection of Software Through Browser Webinjects, filed Oct. 25, 2018.
U.S. Appl. No. 16/688,647 U.S. Pat. No. 10,776,483 Published as: US2020/0134174, Systems and Methods for Remote Detection of Software Through Browser Webinjects, filed Nov. 19, 2019.
U.S. Appl. No. 17/000,135 U.S. Pat. No. 11,126,723 Published as: US2021/0004457, Systems and Methods for Remote Detection of Software Through Browser Webinjects, filed Aug. 21, 2020.
U.S. Appl. No. 17/401,683 U.S. Pat. No. 11,727,114 Published as: US2021/0374243, Systems and Methods for Remote Detection of Software Through Browser Webinjects, filed Aug. 13, 2021.
U.S. Appl. No. 18/333,768 U.S. Pat. No. 12,099,605 Published as: US2023/0325502, Systems and Methods for Remote Detection of Software Through Browser Webinjects, filed Jun. 13, 2023.
U.S. Appl. No. 15/954,921 U.S. Pat. No. 10,812,520 Published as: US2019/0319979, Systems and Methods for External Detection of Misconfigured Systems, filed Apr. 17, 2018.
U.S. Appl. No. 17/014,495 U.S. Pat. No. 11,671,441 Published as: US2020/0404017 Systems and Methods for External Detection of Misconfigured Systems, filed Sep. 8, 2020.
U.S. Appl. No. 18/302,925 Published as: US2023/0269267, Systems and Methods for External Detection of Misconfigured Systems, filed Apr. 19, 2023.
U.S. Appl. No. 16/549,764 U.S. Pat. No. 11,956,265 Published as: US2021/0058421, Systems and Methods for Inferring Entity Relationships Via Network Communications of Users or User Devices, filed Aug. 23, 2019.
U.S. Appl. No. 16/787,650 U.S. Pat. No. 10,749,893, Systems and Methods for Inferring Entity Relationships Via Network Communications of Users or User Devices, filed Feb. 11, 2020.
U.S. Appl. No. 18/429,539 Published as: US2024/0179173, Systems and Methods for Inferring Entity Relationships Via Network Communications of Users or User Devices, filed Feb. 1, 2024.
U.S. Appl. No. 16/583,991 U.S. Pat. No. 10,848,382, Systems and Methods for Network Asset Discovery and Association Thereof with Entities, filed Sep. 26, 2019.
U.S. Appl. No. 17/085,550 U.S. Pat. No. 11,329,878 Published as: US2021/0099347, Systems and Methods for Network Asset Discovery and Association Thereof with Entities, filed Oct. 30, 2020.
U.S. Appl. No. 29/666,942 D. 892,135, Computer Display with Graphical User Interface, filed Oct. 17, 2018.
U.S. Appl. No. 16/360,641 U.S. Pat. No. 11,200,323 Published as: US2020/0125734, Systems and Methods for Forecasting Cybersecurity Ratings Based on Event-Rate Scenarios, filed Mar. 21, 2019.
U.S. Appl. No. 17/523,166 U.S. Pat. No. 11,783,052 Published as: US2022/0121753, Systems and Methods for Forecasting Cybersecurity Ratings Based on Event-Rate Scenarios, filed Nov. 10, 2021.
U.S. Appl. No. 16/514,771 U.S. Pat. No. 10,726,136, Systems and Methods for Generating Security Improvement Plans for Entities, filed Jul. 17, 2019.
U.S. Appl. No. 16/922,673 U.S. Pat. No. 11,030,325 Published as: US2021/0019424, Systems and Methods for Generating Security Improvement Plans for Entities, filed Jul. 7, 2020.

U.S. Appl. No. 17/307,577 U.S. Pat. No. 11,675,912 Published as: US2021/0211454, Systems and Methods for Generating Security Improvement Plans for Entities, filed May 4, 2021.
U.S. Appl. No. 18/138,803 Published as: US2023/0267215, Systems and Methods for Generating Security Improvement Plans for Entities, filed Apr. 25, 2023.
U.S. Appl. No. 19/001,976, Systems and Methods for Generating Security Improvement Plans for Entities, filed Dec. 26, 2024.
U.S. Appl. No. 29/677,306 D. 905,705, Computer Display Screen with Corporate Hierarchy Graphical User Interface, filed Jan. 18, 2019.
U.S. Appl. No. 16/775,840, U.S. Pat. No. 10,791,140, Systems and Methods for Assessing CyberSecurity State of Entities based on Computer Network Characterization, filed Jan. 29, 2020.
U.S. Appl. No. 17/018,587 U.S. Pat. No. 11,050,779 Systems and Methods for Assessing CyberSecurity State of Entities based on Computer Network Characterization, filed Sep. 11, 2020.
U.S. Appl. No. 16/779,437 U.S. Pat. No. 10,893,067 Published as: US2021/0243221, Systems and Methods for Rapidly Generating Security Rating, filed Jan. 31, 2020.
U.S. Appl. No. 17/132,512 U.S. Pat. No. 11,595,427 Published as: US2021/0243221, Systems and Methods for Rapidly Generating Security Rating, filed Dec. 23, 2020.
U.S. Appl. No. 18/158,594 U.S. Pat. No. 11,777,983, Systems and Methods for Rapidly Generating Security Ratings, filed Jan. 4, 2023.
U.S. Appl. No. 18/454,959 Published as: US2024/129332, Systems and Methods for Rapidly Generating Security Ratings, filed Aug. 24, 2023.
U.S. Appl. No. 17/119,822 U.S. Pat. No. 11,122,073, Systems and Methods for Cybersecurity Risk Mitigation and Management, filed Dec. 11, 2020.
U.S. Appl. No. 29/815,855 D. 1,010,666, Computer Display with a Graphical User Interface for Cybersecurity Risk Management, filed Nov. 17, 2021.
U.S. Appl. No. 17/392,521 U.S. Pat. No. 11,689,555 Published as US 2022/0191232, Systems and Methods for Cybersecurity Risk Mitigation and Management, filed Aug. 3, 2021.
U.S. Appl. No. 18/141,654 Published as US2023/0269265, Systems and Methods for Cybersecurity Risk Mitigation and Management, filed May 1, 2021.
U.S. Appl. No. 18/962,320, Systems and Methods for Cybersecurity Risk Mitigation and Management, filed Nov. 27, 2024.
U.S. Appl. No. 29/916,503, Computer Display with a Graphical User Interface, filed Nov. 13, 2023.
U.S. Appl. No. 29/916,519, Computer Display with a Graphical User Interface, filed Nov. 13, 2023.
U.S. Appl. No. 16/802,232 U.S. Pat. No. 10,764,298, System and Mehtods for Improving a Security Profile of an Entity Based on Peer Security Profiles, filed Feb. 26, 2020.
U.S. Appl. No. 16/942,452 U.S. Pat. No. 11,265,330 Published as: US2021/0266324, Systems and Merthods for Improving a Security Profile of an Entity Based on Peer Security Profiles, filed 29, 2020.
U.S. Appl. No. 29/725,724, Computer Display with Risk Vectors Graphical User Interface, filed Feb. 26, 2020.
U.S. Appl. No. 29/736,641 D. 937,870, Computer Display with Peer Analytics Graphical User Interface, filed Jun. 2, 2020.
U.S. Appl. No. 17/039,675 U.S. Pat. No. 11,032,244 Published as: US2021/0099428, Systems and Methods for Determining Asset Importance in Security Risk Management, filed Sep. 30, 2020.
U.S. Appl. No. 17/320,997 U.S. Pat. No. 11,949,655 Published as: US2021/0344647, Systems and Methods for Determining Asset Importance in Security Risk Management, filed May 14, 2021.
U.S. Appl. No. 18/422,470, Published as : US2024/0163262, Systems and Methods for Determining Asset Importance in Security Risk Management, filed Jan. 25, 2024.
U.S. Appl. No. 16/884,607 U.S. Pat. No. 11,023,585, Systems and Methods for Managing Cybersecurity Alerts, filed May 27, 2020.
U.S. Appl. No. 17/236,594 U.S Pat. No. 11,720,679 Published as: US2021/0374246, Systems and Methods for Managing Cyberscurity Alerts, Apr. 21, 2021.

(56) References Cited

OTHER PUBLICATIONS

U.S. Appl. No. 18/335,384 U.S. Pat. No. 12,099,608 Published as: US2023/0325505, Systems and Methods for Managing Cybersecurity Alerts, Jun. 15, 2023.
U.S. Appl. No. 17/710,168 Published as: US2022/0318400, Systems and Methods for Assessing Cybersecurity Risk in Work From Home Environment, Mar. 31, 2022.
U.S. Appl. No. 18/770,949 Published as: US2024/0362342, Systems and Methods for Assessing Cybersecurity Risk in Work From Home Environment, Jul. 12, 2024.
U.S. Appl. No. 17/945,337 Published as: US2023/0091953, Systems and Methods for Precomputation of Digital Asset Inventories, Sep. 15, 2022.
U.S. Appl. No. 18/359,183 Published as: US2024/0045950, Systems and Methods for Assessing Cybersecurity Efficacy of Entities Against Common Control and Maturity Frameworks Using Exernally-Observed Datasets, Jul. 26, 2023.
U.S. Appl. No. 18/162,154 Published as: US2023/0244794,Systems and Methods for Assesstment of Cyber Resilience, Jan. 31, 2023.
U.S. Appl. No. 18/328,142, Systems and Methods for Modeling Cybersecurity Breach Costs, filed Jun. 2, 2023.
U.S. Appl. No. 18/678,378, Systems and Methods for Predicting Cybersecurity Risk Based on Entity Firmographics, filed May 30, 2024.

\* cited by examiner

300

| | | Criticality Tier (330) | | |
|---|---|---|---|---|
| | | Tier 1 | Tier 2 | Tier 3 |
| Security Rating & Risk Vector Grade (310) | Security Rating: (750, 900] AND Botnet Infections = A Open Ports > C File Sharing = A Data Breaches = A | Partial Questionnaire (350a) | Attestation (350b) | Onboard (350c) |
| | Security Rating: (650-750] | Questionnaire (350d) | Partial Questionnaire (350e) | Attestation (350f) |
| | Security Rating (500-650] OR any one of: Botnet Infections <= C Open Ports = F File Sharing <= C Data Breaches <= C | Onsite Audit (350g) | EVA Outreach (350h) | Questionnaire and EVA Outreach (350i) |
| | Security Rating [250-500] | Refusal (350j) | Onsite Audit (350k) | EVA Outreach (350l) |

BITSIGHT  Portfolio ∨  My Company ∨  Reports ∨  Alerts ∨  Analytics ∨

Filters

Search filter options... 🔍  Clear All
Mapped Questions ✕  Flagged Questions ✕

Section +  −
Flags  Clear ① 
☑ Flagged Questions ⑮
☐ Unflagged Questions ㊵

Grades +  −
Risk Vectors

Mapped  Clear ①
Questions
☑ Mapped Questions ㊾
☐ Unmapped Questions ㊋

▽ 15 Rows

| Section / Sub-Section | Question ID | Question |
|---|---|---|
| Information Management / Information Handling | | 6 Questions / 17% of Questions Mapped |
| Information Management / Information Handling | D.5.4.4 | Does the policy or procedure for email, web, and file transfer serv... |
| Operational Procedures and Responsibilities / Change Control | | 5 Questions / 40% of Questions Mapped |
| Operational Procedures and Responsibilities / Change Control | G.3 | Is there an operational change r by management, communicated policy? |
| Operational Procedures and Responsibilities / Change Control | G.3.10 | Do changes to the production e subject to the change control pr... |
| SDLC / SDLC | | 2 Questions / 50% of Questions Mapped |
| SDLC / SDLC | I.2.2 | Is there a secure software deve appropriate constituents and an... |
| SDLC / Application Security QA_UAT Process | | 1 Question / 100% of Questions Mapped |
| SDLC / Application Security QA_UAT Process | I.2.4 | Are applications evaluated from... |

✕ D.5.4.4

Information Management
Information Handling

— Question
Does the policy or procedure for information handling include electronic transmission security requirements including email, web, and file transfer services?

— Risk Vectors
Ⓐ SSL Certificates
Ⓑ SSL Configurations
Ⓒ Open Ports

— Context
TLS/SSL Certificates and TLS/SSL Configurations provide evidence about how data in transit is encrypted, indicating if industry standard testing and best practices are followed. Open Ports provides evidence of risky service/port exposure, a common finding for vulnerability/penetration tests.

FIG. 5B

SYSTEMS AND METHODS FOR ACCELERATING CYBERSECURITY ASSESSMENTS

CROSS-REFERENCE TO RELATED APPLICATION(S)

This application claims the benefit of and priority to U.S. Provisional Application No. 63/217,617, filed on Jul. 1, 2021, entitled "SYSTEMS AND METHODS FOR ACCELERATING CYBERSECURITY ASSESSMENTS," which is hereby incorporated by reference in its entirety.

TECHNICAL FIELD

The following disclosure is directed to methods and systems for cybersecurity risk mitigation and/or management, more specifically, methods and systems for accelerating an entity's protocols for monitoring and managing cybersecurity risks to determine and validate levels of assessment for affiliates having relationships with the entity.

BACKGROUND

Businesses, corporations, organizations, and other 'entities' often outsource tasks to third parties. As a result, such entities have relationships with (e.g., are 'related to' or 'connected to') numerous third party affiliates (i.e., vendors). These relationships can leave entities vulnerable to risks (e.g., threats) arising from the security practices of these third party affiliates. Accordingly, entities may wish to identify third party affiliates requiring additional risk assessment and customize levels of risk assessment based on the cyber security states of the identified third party affiliates.

SUMMARY

Reliably monitoring dozens, hundreds, or even thousands of third party affiliates can consume a large amount of an entity's time and other resources. For entities with a large number of third party affiliates, assessing and monitoring each and every affiliate—especially to the same level of detail—can be prohibitively difficult, expensive, and/or time-consuming. Thus, an entity may wish to allocate risk assessment resources to affiliates based on their criticality to the entity and their associated cybersecurity risk. However, an entity may face difficulty in efficiently prioritizing affiliates for risk assessment (e.g., based on having a large quantity of third part affiliates), as well as in determining appropriate levels of assessment based on the criticality of affiliates to the entity. When an entity chooses an unsuitable risk management protocol for a given affiliate, resources may be wasted (e.g., if the risks associated with the affiliate are small but the risk management protocol selected by the entity for the affiliate uses significant resources) or significant risks may be ignored (e.g., if the risks associated with the affiliate are great but the risk management protocol selected by the entity for the affiliate uses insufficient resources). Further, when a risk management protocol is implemented, an entity may lack techniques to validate completed risk assessments, allowing affiliates to mischaracterize and inaccurately portray their associated cybersecurity states. Such deficiencies can negatively impact the efficacy an entity's risk management and mitigation protocols by allowing cybersecurity risks and threats to go unnoticed.

Thus, there exists a current need for a cybersecurity risk management technique and supporting systems for (1) tiering (i.e., ranking) an entity's affiliates for risk assessment (2) determining a level (i.e., protocol) of risk assessment for each affiliate that optimizes the allocation of security assessment resources of an entity, and (3) validating responses corresponding to the risk assessment from the assessed affiliates. In some embodiments, an entity's affiliates may be tiered based on their criticality to the entity and/or their cyber security risk. Such tiering may be used in combination with one or more security characteristics (e.g., a security rating, security procedure, security control, etc.) to automatically determine a level of risk assessment to perform for a particular affiliate, where the risk assessment may include a plurality of questions as part of a questionnaire. In some embodiments, one or more risk vectors may be mapped to each of the responses corresponding to the questions of the questionnaire, such that the risk vector(s) indicate a state of each response to a question. An assessment report may be generated based on the responses to the questionnaire, where the assessment report may include an indication of flagged responses corresponding to security attributes and/or areas that require further review, improvement, and/or remediation. Responses may be automatically flagged based on a weighted combination of the risk vectors corresponding to each response, such that an entity may automatically identify cyber security risks corresponding to an affiliate and determine the validity of an affiliate's responses. In one aspect, the disclosure features a computer-implemented method including selecting, for an affiliate of a plurality of affiliates of an entity, a cybersecurity action plan, wherein the selection is based on a combination of a cybersecurity criticality tier, one or more risk vector ratings, and a security rating for the affiliate, wherein each risk vector rating is indicative of a state of a cybersecurity characteristic of the affiliate, wherein the cybersecurity criticality tier is selected from a set of cybersecurity criticality tiers. The method also includes sending, to the affiliate, one or more questions, wherein each question is indicative of a cybersecurity risk of the affiliate, wherein at least one question of the one or more questions is mapped to at least one risk vector and at least one risk vector rating of the one or more risk vector ratings. The method also includes receiving, from the affiliate, a response to each of the one or more questions. The method also includes, for each question mapped to at least one risk vector rating, determining a risk score based on a weighted combination of the at least one risk vector rating and at least one weight; determining, based on a comparison of the risk score to a threshold, an indication of whether the question is indicative of a cybersecurity risk; and if the risk score is less than or equal to the threshold, assigning a flag to the question to indicate the question is indicative of a cybersecurity risk. The method also includes displaying an assessment report configured to show an assessment of cybersecurity risk of the affiliate, wherein the assessment report comprises the one or more questions, the response to each of the one or more questions, the at least one risk vector rating for each question mapped to the at least one risk vector, and the flag for each question that is assigned the flag. Other aspects of the invention comprise systems implemented in various combinations of computing hardware and software to achieve the methods described herein.

In some embodiments, the risk vector may include at least one of an amount of capital investment; a measure of employee training; an amount of the entity's budget for security; a number of spam propagation instances originating from a computer network associated with the entity; a number of malware servers associated with the entity; a number of potentially exploited devices associated with the entity; and a number of hosts authorized to send emails on behalf of each domain associated with the entity. The risk vector rating may be a numerical rating. Each of the risk vectors may correspond to one of a plurality of risk vector types. The plurality of risk vector types may include data breaches, open ports, botnet infections, potentially exploited devise, file sharing, and other risk vector type. Each of the plurality of risk vector types may correspond to one of a plurality of weight, the plurality of weight being numerical. The risk score may be calculated by dividing a sum of a multiplication of each of the risk vector rating and a corresponding weight by a sum of a total weight. The cybersecurity criticality tier may be a level of criticality of a relationship between the entity and the affiliate.

These and other objects, along with advantages and features of embodiments of the present invention herein disclosed, will become more apparent through reference to the following description, the figures, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 3 depicts an example of a risk assessment matrix, according to some embodiments;

FIG. 5A depicts an example of a user interface for cyber security risk assessment, according to some embodiments;

FIG. 5B depicts an example of a user interface for cyber security risk assessment, according to some embodiments.

DETAILED DESCRIPTION

Figure 1:
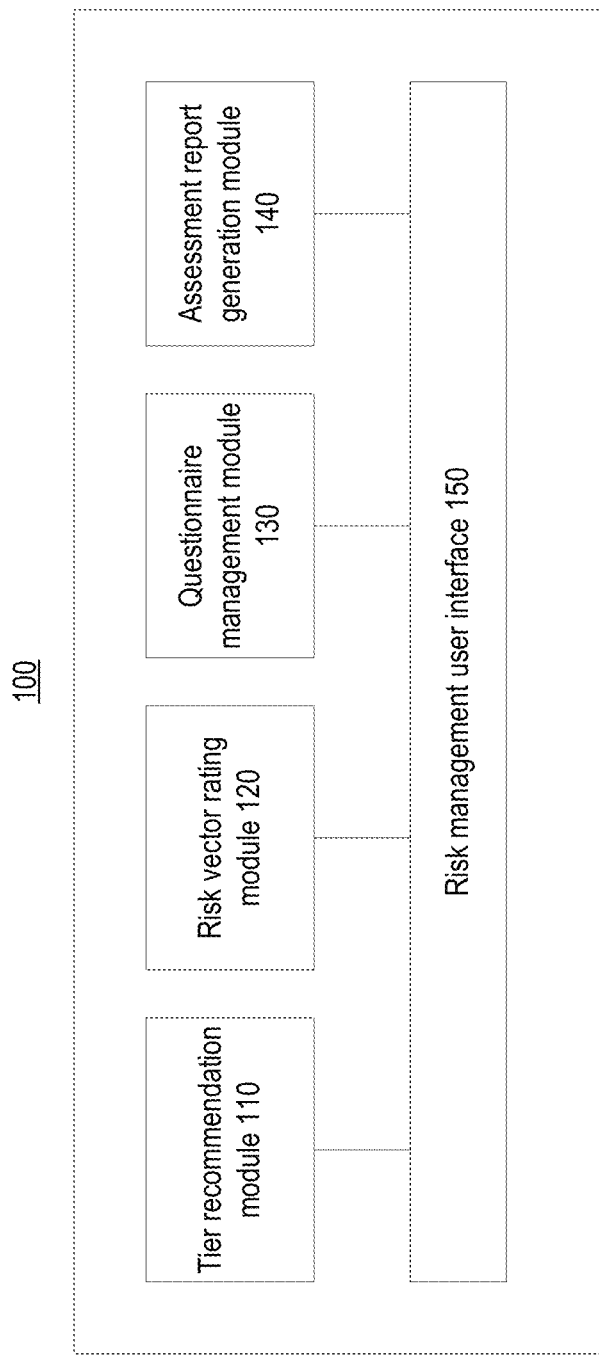
FIG. 1 is a block diagram of a risk management tool, according to some embodiments.

The present disclosure is directed to methods and systems for cybersecurity risk mitigation and/or management, more specifically, methods and systems for accelerating an entity's protocols for monitoring and managing cybersecurity risks to determine and validate levels of assessment for affiliates having relationships with the entity.

Action plans corresponding to levels of the assessment may be specified for affiliates, for example, based on the affiliates' security ratings, the criticality of the entity's relationships to the affiliates, and/or one or more risk vector ratings or grades. Affiliates may be tiered (i.e. ranked) based on the criticality of the entity's relationships to the affiliates.

In some embodiments, action plans may include questionnaires, where affiliate responses to the questionnaires may be mapped to risk vectors. Questionnaires may be curated based on the determined action plan. Risk vectors for each response may be combined to determine an indication of a state of each response to the questionnaire. In some embodiments, unsatisfactory responses may be automatically flagged based on a weighted combination of the risk vectors corresponding to each response. A flagged response may indicate that a security attribute of an affiliate requires further attention and/or improvement, enabling an entity to identify security risks associated with its affiliates.

The methods and related systems disclosed herein provide for significant improvements in monitoring and mitigation of cybersecurity threats to an entity, and constitute specific implementations of solutions to problems that arise when attempting to monitor and mitigate the cybersecurity risks faced by an entity. Thus, the improved cybersecurity mitigation techniques described herein constitute improvements to computer-related technology for reasons similar to those articulated by the Federal Circuit in Finjan, Inc. v. Blue Coat Systems, Inc. (Fed. Cir. 2018), among other reasons, and are not abstract ideas.

As used herein, an "affiliate" of a particular entity may be any individual, organization, corporation and/or other entity that interacts with, provides services to, and/or otherwise has a relationship to or with the particular entity.

As used herein, the "criticality" of an entity's relationship to an affiliate may be a measurement or characterization of the extent to which the entity's well-being (e.g., operational integrity, health, reputation, financial position, security state, etc.) is sensitive to (e.g., dependent on) the affiliate's well-being, the frequency of such interactions, the volume of data exchanged between the entity and any given affiliate, and/or the sensitivity of such data.

An entity may monitor the security status (e.g., security ratings, security events, etc.) of one or more of the entity's affiliates. The monitored affiliates may be referred to herein as the entity's "portfolio" of affiliates. An entity's portfolio may include any number of the entity's affiliates (e.g., one or more, dozens, hundreds, thousands, etc.).

"Characteristics" of an entity (e.g., an affiliate or other entity) may include, without limitation, size (e.g., the number of employees or other members of the entity, the entity's market capitalization or annual revenues, etc.); the business sector (e.g., industry, sub-industry, etc.) in which the entity operates (e.g., legal services, technology, finance, etc.); age; rate of growth; North American Industry Classification System (NAICS) code; Standard Industrial Classification (SIC) code; a number of services provided by the entity; a security rating (e.g., as provided by BitSight Technologies, Inc. of Boston, Massachusetts, USA); a geographical location of the entity; a location of the entity based on one or more IP addresses associated with the entity (e.g., "geo IP" footprint); a number of Internet Protocol (IP) addresses associated with the entity; the technology used by the entity (e.g., server software, user software, etc.); one or more security risk types of an entity; and/or known competitors or entities similar to the particular entity based on the web activity of the entity. Values for one or more of the above-listed entity characteristics may be provided by the entity itself, obtained from third party sources (e.g., a firmographics data source, data from BuiltWith® Pty Ltd), and/or collected or extracted from publicly available information. In some embodiments, the values for one or more entity characteristics can be stored in a database.

A "security profile" of an entity may reflect the past, present, and/or future security characteristics of an entity. In some embodiments, the security profile may reflect security risks to which the entity is exposed balanced by the countermeasures that the entity has taken or can take to mitigate the security risk. As referred to herein, a security profile of an entity can include a "security rating" (e.g., "security score") for the entity. A security rating may be quantitative or qualitative. For example, a quantitative security rating may be expressed as a number within a predetermined range (e.g., between 250 and 900, as provided by BitSight Technologies, Inc. of Boston, Massachusetts, USA). Some non-limiting examples of techniques for determining security ratings of entities are described in U.S. patent application Ser. Nos. 16/802,232, 13/240,572, 15/142,677, and 16/514,771.

As used herein, "monitoring" an affiliate may refer to determining (e.g., obtaining) a security rating of the affiliate from time to time, identifying one or more activities or events relevant to the affiliate's security profile, etc. Some non-limiting examples of techniques for determining security ratings of entities are described in U.S. patent application Ser. Nos. 16/802,232, 13/240,572, 15/142,677, and 16/514,771.

Some Embodiments of Cybersecurity Risk Assessment Method

An entity's relationships to different affiliates may pose different levels of risk to the entity. Thus, it is often appropriate for an entity to adopt different risk management protocols for different affiliates, depending on characteristics of the entity, characteristics of the affiliates, the nature of the entity's relationship to the entity, and/or other factors. However, determining the most suitable risk management protocol for a given affiliate can be difficult and time-consuming, which can be exacerbated by an entity having relationships with a large number of affiliates. When an entity chooses an unsuitable risk management protocol for a given affiliate, resources may be wasted or significant risks may be ignored. Moreover, as characteristics change, the protocols may change, requiring ongoing reassessments of how a particular affiliate or group of affiliates may be monitored.

Thus, a tool for determining, executing, and validating the appropriate cybersecurity risk management protocols for an entity's various affiliates is needed. Referring to FIG. 1, an example of a risk management tool 100 is shown. In some embodiments, the risk management tool 100 may recommend risk management protocols for various affiliates based, for example, on characteristics of the affiliate, characteristics of the entity, the nature of the entity's relationships to the affiliates, risk management protocols adopted by other entities for the same affiliates or similar affiliates, and/or other factors. The risk management protocols may specify, for example, (1) which of an entity's affiliates are to be prioritized for cybersecurity risk assessment, (2) what action(s) are to be taken with respect to an affiliate that poses a potential cybersecurity risk, and/or (3) under what conditions those action(s) are to be taken. In some embodiments, the risk management tool 100 may be included with a cybersecurity monitoring system of a risk management service provider. Some non-limiting examples of cybersecurity monitoring systems are described in U.S. patent application Ser. Nos. 16/802,232, 13/240,572, 15/142,677, and 16/514,771. In some embodiments, the risk management tool 100 may be communicatively coupled to a third party computing system. In some cases, the risk management tool may be coupled to more than one third party computing system.

Some embodiments of a risk management tool 100 are described below. In some embodiments, the risk management tool may include a tier recommendation module 110, which may recommend assignment of an entity's affiliates (e.g., monitored affiliates, unmonitored affiliates, or monitored and unmonitored affiliates) to various "criticality tiers." The criticality tier to which an affiliate is assigned may indicate a level of criticality of the entity's relationship to the affiliate. For example, the criticality tier to which an entity assigns an affiliate may indicate the extent to which the entity's well-being (e.g., operational integrity, health, reputation, financial position, security state, etc.) is sensitive to (e.g., dependent on) the affiliate's well-being. In some embodiments, the tier recommendation module 110 may determine the recommended criticality tiers for an entity's affiliates by performing a risk management method 200 as described below with reference to FIG. 2.

In some embodiments, the risk management tool 100 may include a risk vector rating module 120. The risk vector rating module 120 may obtain one or more risk vector ratings and/or grades for an entity's affiliates. Risk vector ratings or grades may be determined for a risk vector based on a metric (e.g., a measurement, value, number, or amount) or an evaluation (e.g., a categorical or binary determination) associated with the risk vector. The risk vector ratings or grades may be determined based on mapping the metric to one or more thresholds or ranges that are indicative of a risk vector rating or grade. The risk vector ratings or grades may be determined based on mapping the evaluation to one or more categories or partitions that are indicative of a risk vector rating or grade. Examples for determining security ratings and risk vector ratings or grades for an entity are described further below in the section titled "Security Ratings of Entities." A risk vector may be based on externally observable information for an entity that serves as a proxy (i.e. indicator) of a cyber security state of an entity (e.g., affiliate). This externally observable information can be categorized into observable subject areas (i.e. risk vectors), which can each be independently determined and/or characterized. For example, one possible proxy for entity vulnerability is the number of entity-owned IP addresses which are reported by third parties to be malicious. The greater the number of reports, the more likely the particular entity was vulnerable and had been compromised. Examples of risk vectors may include:

an amount of capital investment in the security of the entity;
a measure of employee training in the security of the entity;
a measure of organization of entity personnel dedicated to information security;
an amount of the entity's budget dedicated to information security;
a number and/or severity of botnet infection instances of a computer system associated with the entity;
a number of spam propagation instances originating from a computer network associated with the entity;
a number of malware servers associated with the entity;
a number of potentially exploited devices associated with the entity;
a number of hosts authorized to send emails on behalf of each domain associated with the entity;
a determination of whether a DomainKeys Identified Mail (DKIM) record exists for each domain associated with the entity and/or a key length of a public key associated with a Domain Name System (DNS) record of each domain associated with the entity;

an evaluation of a Secure Sockets Layer (SSL) certificate and/or a Transport Layer Security (TLS) certificate associated with a computer system of the entity;

a number and/or type of service of open ports of a computer network associated with the entity;

an evaluation of security-related fields of a header section of HTTP response messages of hosts associated with the entity;

a rate at which vulnerabilities are patched in a computer network associated with the entity;

an evaluation of file sharing traffic originating from a computer network associated with the entity; and/or a number of lost records and/or sensitivity of information in the lost records in a data breach of a computer system associated with the entity.

In some embodiments, risk vectors may be mapped to one or more ratings and/or grades, where each rating and/or grade corresponds to a state (e.g., poor, satisfactory, good, excellent) of a risk vector. The risk vector rating module 120 may obtain and/or store the mappings of ratings and/or grades to risk vectors for each of an entity's affiliates. In some embodiments, the ratings may be numerical ratings, e.g., 0-4, 0-5, 1-10, 1-100, etc. In some cases, high ratings (e.g., relative to a range of ratings) may correspond to positive state for a risk vector, while low ratings may correspond to a negative state for a risk vector. In some embodiments, the grades may be any suitable grades, e.g., "A", "B", "C", "D", or "F". A state of a risk vector mapped to an "A" letter grade may have the best or highest favorability, while a state of a risk vector mapped to an "F" letter grade may have the worst or lowest favorability. An example of risk vector grades with corresponding ratings is shown by Table 1:

TABLE 1

Risk Vector Grades & Ratings

| Risk Vector Grade | Rating (R) |
| --- | --- |
| A ("Positive") | 4 |
| B | 3 |
| C | 2 |
| D | 1 |
| F ("Negative") | 0 |

As shown in Table 1, an "A" letter grade may correspond to a "4" rating, while an "F" letter grade may correspond to a "0" rating, where an "A" letter grade may reflect positively on the state of the risk vector and an "F" letter grade may reflect negatively on a state of the risk vector. The risk vector grades and ratings shown in Table 1 are examples and may be supplemented, modified, and/or removed.

In some embodiments, particular risk vectors may be associated with a weight (e.g., numerical weight). A particular risk vector may be weighted based on an assigned numerical value. Weightings may be based on any suitable range, e.g., 0-1, 0-5, 1-4, 1-10, etc. An example of risk vector weightings is shown by Table 2:

TABLE 2

Risk Vector Weighting

| Risk Vector Type | Weight (W) |
| --- | --- |
| Data breaches | 4 |
| Open ports | 4 |
| Botnet infections | 3 |
| Potentially exploited devices | 3 |
| File sharing | 2 |
| Other | 1 |

As shown in Table 2, example risk vector types may include "data breaches", "open ports", "botnet infections", "potentially exploited devices", "file sharing", and "other". "Data breaches" may correspond to a risk vector for a number of lost records and/or sensitivity of information in the lost records in a data breach of a computer system associated with the entity. "Open ports" may correspond to a risk vector for a number and/or type of service of open ports of a computer network associated with the entity. "Botnet infections" may correspond to a risk vector for a number and/or severity of botnet infection instances of a computer system associated with the entity. "Potentially exploited devices" may correspond to a risk vector for a number of potentially exploited devices associated with an entity (e.g., affiliate). "File sharing" may correspond to a risk vector for an evaluation of file sharing traffic originating from a computer network associated with an entity (e.g., affiliate). "Other" may correspond to any other risk vector type as described herein. The risk vector types and weights shown in Table 2 are examples and may be supplemented, modified, and/or removed.

In some embodiments, the risk vector rating module 120 may receive and/or otherwise obtain risk vector information from security characteristics for an entity's affiliates as described below in the section titled "Security Ratings of Entities." Based on the received risk vector information, the risk vector rating module 120 may store the received risk vector information with corresponding weights as described herein. Based on the risk vector information and corresponding weights, an weighted risk vector score may be determined by an assessment report generation module 140.

In some embodiments, the risk management tool 100 may include a questionnaire management module 130. The questionnaire management module 130 may manage one or more questionnaires that may be completed by an entity's affiliates. In some embodiments, the risk management tool 100 may send a questionnaire (e.g., full or partial questionnaire) or cause a third party computing system to send a questionnaire to an affiliate (e.g., via a computer network), such that the affiliate may complete the questionnaire by responding to one or more included questions. A questionnaire may include questions directed to evaluation of security assets, practices, and processes that an entity may wish to assess and measure. In some embodiments, each question may be mapped to a question identifier (ID). A question data store (i.e. question bank) of a computing system external to the risk management tool 100 may include a plurality of questions, where questions included in each of the one or more questionnaires are selected from the plurality of questions. In an example, a risk management service provider that provides the risk management tool 100 to an entity may operate a computing system that includes the question data store, where the risk management tool 100 and risk management service provider computing system are communicatively connected. In some cases, one or more questions of the plurality of questions may be mapped to one or more risk vectors as described herein. Questions may be added or removed to the plurality of questions of the question data store, such that the questionnaires available in the risk management tool 100 may be updated and/or otherwise modified. In an example, the questionnaire management module 130 may receive updated questionnaires from the computing system external to the risk management tool 100, while existing questionnaires available in the questionnaire management module 130 may be removed. A questionnaire may include one or more characteristics as described below in the section titled "Some Embodiments of Action Plan Execution by Entities."

In some embodiments, the risk management tool 100 may include an assessment report generation module 140. The assessment report generation module 140 may generate one or more assessments reports corresponding to completed questionnaires, where a completed questionnaire was directed to an affiliate of an entity. The assessment report generation module 140 may generate an assessment report by performing a risk assessment method 400 as described below with reference to FIG. 4. As a part of an action plan, an entity may send or cause a third party computing system to send an assessment or questionnaire (e.g., from the questionnaire management module 130) to an affiliate for completion. An assessment report may include one or more responses from an affiliate, where each response is directed to a question include in a questionnaire. In some embodiments, particular questions of a questionnaire may be mapped to the one or more risk vectors and risk vector ratings or grades. In some embodiments, a particular question may be mapped to more than one risk vector and risk vector rating or grade. In an example, a question may be mapped to two risk vectors having risk vector ratings ranging from 0-4 as described herein with respect to Table 1.

In some embodiments, the assessment report generation module 140 may generate one or more weighted risk vector scores. A weighted risk vector score may correspond to a single question included in a questionnaire, where the weighted risk vector score may be a function of the risk vector ratings mapped to the question. The assessment report generation module 140 may generate weighted risk vector scores for questions that are mapped to one or more risk vectors. In an example, the assessment report generation module 140 may generate a weighted risk vector score according to Equation 1:

$$\text{Weighted Average Score} = \frac{W_1 R_1 + W_2 R_2 + \ldots + W_n R_n}{W_1 + W_2 + \ldots + W_n} \quad \text{Equation 1}$$

As shown in Equation 1, the weighted risk vector score ("Weighted Average Score") may be determined based on a function of a weight "W" and a risk vector rating "R". The weight "W" may be mapped to each risk vector and may be configured (e.g., preconfigured) in the risk management tool 100 (e.g., by a user or a system administrator of a risk management service provider). In an example, for a question that is mapped to one risk vector, the weighted risk vector score may be equivalent to the risk vector rating "R" corresponding to the risk vector. As shown in Equation 1, "n" may be a number of risk vectors corresponding to a question for which a weighted risk vector score is calculated. In an example, for a question mapped to three risk vectors, three weights "$W_1$", "$W_2$", and "$W_3$" and three risk vector ratings "$R_1$", "$R_2$", and "$R_3$" may be included in Equation 1. In some embodiments, alternate generation methods for a weighted risk vector score may be possible.

In some embodiments, based on generating one or more weighted risk vector scores, the assessment report generation module 140 may compare the one or more weighted risk vector scores to a configured threshold. The comparison to the configured threshold may provide an indication of whether the risk vector rating(s) mapped to the question is/are indicative of poor and/or risky cyber security practices. In an example, the configured threshold may be 3. If a weighted risk vector score is less than or equal to the configured threshold, the assessment report generation module 140 may flag the question corresponding to the weighted risk vector score. Flagging a question may indicate that the question requires further attention and/or remediation (e.g., due poor and/or risky cyber security practices indicated by the risk vector rating(s) mapped to the question). If a weighted risk vector score is greater than the configured threshold, the assessment report generation module 140 may not flag the question corresponding to the weighted risk vector score. Not flagging a question may indicate that the risk vectors rating(s) mapped to the question is/are indicative of satisfactory cyber security practices associated with the response. As an example, an entity may respond to a first question in a questionnaire, where the first question is mapped to two risk vectors: Botnet infections ($W_1=3$) and Open ports ($W_1=4$). The entity may have a grade of D for both risk vectors ($R_1=R_2=1$), such that Equation 1 yields a weighted risk vector score of 1. Based comparing the weighted risk vector score of 1 to the configured threshold of 3, the first question in the questionnaire may be flagged by the assessment report generation module 140 based on the weighted risk vector being less than the configured threshold. Using flagged questions included in the generated assessment reports, entities may identify affiliates with poor and/or risky cyber security practices, as well as the specific areas in which the affiliates may require risk mitigation and/or remediation.

In some embodiments, the risk management tool 100 may be implemented as software executed on one or more computer systems 800. For example, the risk management tool may be implemented as software executed on an entity's computer systems or a third party entity's computer systems, where the third party entity (e.g., risk management service provider) provides services to the entity. In some embodiments, the risk management tool 100 may provide a user interface 150. The user interface 150 may present (e.g., display) information regarding the security states of an entity's affiliates (e.g., the cybersecurity risks posed by the entity's affiliates) and/or the entity's risk mitigation plans with respect to various affiliates.

In some embodiments, the user interface 150 may provide interactive components whereby a user may interact with the tier recommendation module 110. For example, by interacting with a user interface 150, the user may question the tier recommendation module 110 regarding the recommended criticality tier(s) for one or more of the entity's affiliates. In response to such a question, the tier recommendation module 110 may obtain the recommended criticality tier(s) for the specified affiliates (e.g., by performing the risk management method 200, or by retrieving previously-determined criticality tier recommendations from a storage device) and provide those recommendations to the user via the user interface 150.

In some embodiments, the user interface 150 may provide interactive components whereby a user may interact with the risk vector rating module 120. For example, by interacting with a user interface 150, the user may review ratings, grades, and/or weightings mapped to risk vectors for each of an entity's affiliates.

In some embodiments, the user interface 150 may provide interactive components whereby a user may interact with the questionnaire management module 130. For example, a user may access questionnaires available to send or cause to send to an entity's affiliate as a part of an action plan. By interacting with the user interface 150, a user may send or cause a third party computing system to send a questionnaire to an affiliate from the questionnaire management module 130.

In some embodiments, the user interface 150 may provide interactive components whereby a user may interact with the assessment report generation module 140. For example, by interacting with a user interface 150, the user view assessment reports corresponding to completed assessments and/or questionnaires from an entity's affiliates. The user may review responses to questions include in the assessments and/or questionnaires and may review the risk vectors mapped to each question and response. Based on reviewing the responses to questions, the user may validate the responses from the affiliate (e.g., by comparing the response to externally observed data). The user may review weighted risk scores corresponding to particular questions and responses. If a weighted risk score is less than or equal to the configured threshold, the user may view a flag indication displayed with the question corresponding to the weighted risk score.

Some embodiments and/or applications of the tier recommendation module 110, the risk vector rating module 120, the questionnaire management module 130, the assessment report generation module 140, and the user interface 150 are described in further detail below. In addition, some embodiments of a risk management method 200 are described below.

The tier recommendation module 110 may recommend assignment of one or more (e.g., all) of an entity's affiliates to various "criticality tiers." In some embodiments, the risk management tool 100 may provide tiering recommendations to a user (e.g., via the user interface 150), who may then adopt one or more of the recommendations (e.g., by providing user input indicating acceptance of said recommendations) and/or adjust one or more of the recommendations (e.g., by providing user input overriding the recommended criticality tiers for one or more of the entity's affiliates). In some embodiments, the tier recommendation tool 110 may provide the tiering recommendations for an entity's affiliates during an onboarding process for an entity that is establishing or updating risk management protocols with respect to its affiliates.

The risk management tool 100 may support assignment of an entity's affiliates to any suitable number of criticality tiers (e.g., 2-10 tiers, 2 tiers, 3 tiers, 5 tiers, etc.). The tiers may have any suitable labels, and the criticality levels corresponding to the tiers may have any suitable relationship to the tier labels. For example, the risk management tool 100 may support 3 criticality tiers, which may be referred to as Tier 1, Tier 2, and Tier 3, with Tier 1 affiliates being most critical to an entity's well-being, Tier 2 affiliates being moderately critical to an entity's well-being, and Tier 3 affiliates being least critical to an entity's well-being. Unless otherwise noted, the examples described herein are based on the foregoing configuration of tiers. However, alternative tiering configurations are possible.

In some embodiments, tier recommendation module 110 (or "tier recommender" 110) uses one or more models (e.g., mathematical, statistical, and/or machine-learned models) to generate affiliate tiering recommendations for entities. For example, the tier recommender 110 may use a single model to generate affiliate tiering recommendations for all entities. Alternatively, the tier recommender 110 may use different models to generate affiliate tiering recommendations for different sets of entities (e.g., entity peer groups or other sets of entities). Examples of generating affiliate tiering recommendations for different sets of entities can be found in at least U.S. patent application Ser. No. 17/119,822 filed on Dec. 11, 2020 and titled "Systems And Methods For Cybersecurity Risk Mitigation And Management," which is incorporated herein by reference in its entirety.

As previously mentioned, the risk management tool may provide a user interface 150, which may present information regarding the security states of an entity's affiliates and/or the entity's risk mitigation plans with respect to various affiliates. In some embodiments, the user interface 150 may provide interactive components whereby a user may interact with the tier recommendation module 110, the risk vector rating module 120, the questionnaire management module 130, and/or the assessment report generation module 140.

Figure 2:
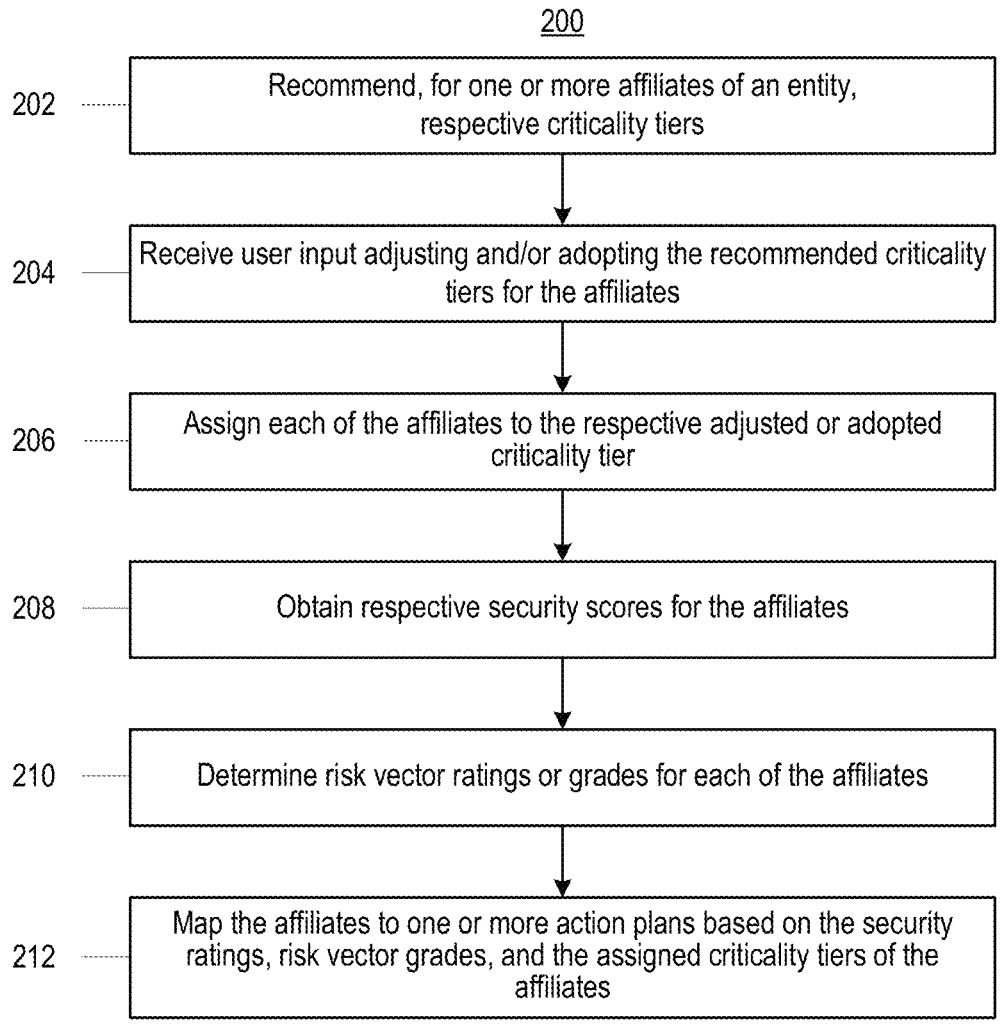
FIG. 2 depicts a flowchart of an entity-specific cybersecurity risk management method, according to some embodiments.

FIG. 2 depicts an entity-specific cybersecurity risk management method 200, according to some embodiments. In the example of FIG. 2, the risk management method 200 includes steps 202-212, which are described below. In some embodiments, the risk management method 200 is performed, for example, by a risk management tool 100 (e.g., by a tier recommendation module 110, a risk vector rating module 120, and/or a questionnaire management module 130 of the risk monitoring tool 100).

In step 202 of the method 200, the risk management tool 100 recommends, for each of a plurality of affiliates of an entity, a respective cybersecurity criticality tier. The criticality tier may be selected from a set of criticality tiers. Recommending criticality tiers for the plurality of affiliates may involve identifying the recommended criticality tiers for the affiliates, and presenting the recommended criticality tiers for the of affiliates via a user interface component (e.g., the user interface 150). The recommended criticality tiers for the affiliates may be identified using a machine-learned model. The machine-learned model may be selected based on a peer group of the entity. The peer group of the entity may be identified based on one or more characteristics of the entity (e.g., the entity's size, an industry in which the entity operates, and/or a sector in which the entity operates). The machine-learned model may identify a particular recommended criticality tier for a particular affiliate based on (1) one or more characteristics of the particular affiliate and (2) an analysis of a plurality of tier assignments made by a plurality of peer entities included in the peer group, wherein each of the tier assignments is an assignment of an affiliate of at least one of the peer entities to a criticality tier. In some embodiments, the model's identification of a criticality tier for an affiliate may also be based on one or more characteristics of the entity (e.g., the size of the entity's portfolio of monitored affiliates). In some embodiments, the machine-learned model is a regression model (e.g., a linear regression model).

In some embodiments, a process for identifying the recommended criticality tiers for a plurality affiliates includes steps of (1) generating, using the machine-learned model, respective criticality scores for the plurality of affiliates; (2) normalizing the criticality scores, thereby generating normalized criticality scores within a bounded range; (3) partitioning the normalized criticality scores into a number of partitions equal to the number of criticality tiers, wherein each of the partitions corresponds to a respective one of the criticality tiers; and (4) for each affiliate, selecting the criticality tier corresponding to the partition to which the normalized criticality score of the affiliate is assigned, and identifying the selected criticality tier as the recommended criticality tier for the affiliate.

In step 204 of the method 200, the risk management tool 100 receives user input adjusting and/or adopting the recommended criticality tier for each of the affiliates. Such user input may be received, for example, via a component of a user interface 150.

In step 206 of the method 200, the risk management tool 100 assigns each of the affiliates to the respective criticality tier adjusted or adopted in step 204. The risk management tool 100 may make these assignments in response to user input received via a component of a user interface 150.

In step 208 of the method 200, the risk management tool 100 obtains respective security ratings for each of the affiliates. Some techniques for obtaining security ratings for entities (e.g., affiliates) are described above.

In step 210 of the method 200, the risk management tool 100 obtains risk vector ratings or grades for each risk vector mapped to each of the affiliates. Risk vector ratings or grades may be obtained based on states of risk vectors derived from security characteristics of each of the affiliates. Some techniques for obtaining risk vector ratings and grades are described below in the section titled "Security Ratings of Entities."

In step 212, the risk management tool 100 maps each of the affiliates to one or more action plans. The mapping of the one or more action plans may be based on a risk assessment matrix, however, any suitable mapping of an affiliate to an action plan based on a criticality tier, security rating, and risk vector rating or grade may be used. The risk assessment matrix may be a two-dimensional matrix that includes one or more partitions corresponding to a first dimension and a second dimension. Each partition of the risk assessment matrix may include an action plan. Each action plan may correspond to a level of risk assessment to be performed for a particular affiliate. In some embodiments, a first dimension of the risk management matrix may correspond to a range of security ratings and/or a set of thresholds corresponding to risk vector ratings or grades. The security ratings may be indicative of a cyber security state of an affiliate. In some embodiments, a second dimension of the risk assessment matrix may include a set of one or more criticality tiers, where an affiliate may be mapped to an action plan based on their assigned criticality tier.

In some embodiments, as a part of mapping each of the affiliates to one or more action plans, the risk management tool 100 displays a user interface component configured to show a visualization of a cybersecurity risk management plan of the entity with respect to the plurality of affiliates. The visualization of the cybersecurity risk management plan may include the risk assessment matrix, such that the first dimension of the matrix corresponds to a range of security ratings and/or a set of thresholds corresponding to risk vector ratings or grades, and the second dimension of the matrix corresponds to a set of criticality tiers.

The risk management plan may partition the affiliates into a plurality of affiliate sets within the risk assessment matrix based on the security ratings, risk vector ratings or grades, and the assigned criticality tiers of the affiliates. The risk management plan may specify, for each of the affiliate sets, an action plan to be taken by the entity with respect to the affiliates in the affiliate set. The action plan to be taken by the entity with respect to the affiliates in a given set may include monitoring the affiliates, investigating the affiliates, and/or contacting the affiliates.

FIG. 3 depicts an example of a risk assessment matrix 300 by which an action plan may be mapped to an affiliate. The risk assessment matrix 300 may be a two-dimensional matrix that includes one or more partitions 350 corresponding to a first dimension and a second dimension. Included in each partition 350 may be an action plan that may be mapped to an entity. For example, as shown in FIG. 3, partition 350e indicates an action plan that includes a partial questionnaire. The action plans shown in FIG. 3 are example, such that any suitable action plan may be associated with a partition 350 of the risk assessment matrix 300. As shown in FIG. 3, the risk assessment matrix 300 may have a first dimension 310 corresponding to a range of security ratings and/or a set of thresholds corresponding to risk vector ratings or grades. The ranges of security ratings and risk vector grade thresholds shown in FIG. 3 are examples, such that any combination of suitable ranges for security ratings and thresholds for risk vector ratings or grades may be used to map an affiliate to an action plan. As shown in FIG. 3, a second dimension 330 of the risk assessment matrix 300 may include a set of criticality tiers. The three criticality tiers ("Tier 1", "Tier 2", and "Tier 3") shown in FIG. 3 are examples and any suitable number of criticality tiers may be used for the risk assessment matrix 300. As described herein with respect to the risk management method 200, an affiliate may be mapped to an action plan of a partition 350 of the risk assessment matrix 300 based on a combination of an affiliates criticality tier, security rating, and risk vector rating(s) or grade(s).

Some Embodiments of Action Plan Execution by Entities

In some embodiments, as described herein, an entity may adopt different risk management protocols for different affiliates, depending on characteristics of the entity, characteristics of the affiliates, the nature of the entity's relationship to the entity, and/or other factors. Accordingly, affiliates may be mapped to one or more action plans as a part of the risk management protocols based on the security ratings, risk vector ratings or grades, and the assigned criticality tiers of the affiliates. Such action plans may include monitoring the affiliates, investigating the affiliates, and/or contacting the affiliates, as well as terminating relationships with affiliates.

In some embodiments, an action plan may require an entity (e.g., affiliate) to provide an entity attestation, where the entity may attest to one or more standard cybersecurity practices or frameworks. Examples of standard cyber security practices or frames may include those defined by the NIST, ISO, SOC, etc. In some embodiments, an action plan may include onboarding, where an entity may allow an affiliate to establish or maintain a relationship with the entity without further assessment at that instance. In some embodiments, an action plan may include an onsite audit, where an entity may directly engage with an affiliate (e.g., at an affiliate's office, data center, information technology center, etc.) and/or an affiliate's computing system(s) to review and evaluate the affiliate's security practices. In some embodiments, an action plan may include an Enable Vendor Access (EVA) outreach, where an entity may invite an affiliate to access the risk management tool 100 and/or a third party application to collaborate and/or address the affiliate's cybersecurity practices. In some embodiments, an action plan may include a refusal, where an entity may terminate or choose not to establish a relationship with an affiliate. An entity may refuse an affiliate based on a combination of risky security ratings, risky risk vector ratings or grades, and a high criticality tier. In an example, based on the risk assessment matrix, a first affiliate having a security rating of less than 500 and a moderate criticality tier (e.g., Tier 2) may be assigned an onsite audit as an action plan, while a second affiliate having a security rating of less than 500 and a high criticality tier (e.g., Tier 1) may be assigned a refusal as an action plan.

In some embodiments, an action plan may include sending a questionnaire (e.g., full or partial questionnaire) to an affiliate, such that the affiliate may complete the questionnaire by responding to one or more included questions. Questionnaires available to users of the risk management tool 100 may be stored or available via the questionnaire management module 130 as described herein. In some embodiments, a questionnaire may include questions directed to evaluation of security assets, practices, and processes of an entity (e.g., affiliate), such that an entity may evaluate the security practices of affiliates having relationships with the entity. Responses to the questionnaires may provide insights on an entity's (e.g., affiliate's) security controls and procedures, as well as compliance with internal and regulatory cyber security requirements. Examples of questionnaires may include standard free assessment questionnaires (e.g., a National Institute of Standards and Technology (NIST) questionnaire), commercial assessment questionnaires (e.g., a Standardized Information Gathering (SIG) questionnaire), and customized questionnaires for an entity. Customized questionnaires for an entity may be generated by a third party entity (e.g., a risk management service provider). In an example, a risk management service provider may send one or more questionnaires to the risk management tool 100, such that the available questionnaires at the risk management tool 100 may be sent by an entity to affiliates based on determined action plans.

In some embodiments, questionnaires (e.g., standard, commercial, or customized) may be accessible in the risk management tool 100 (e.g., via the questionnaire management module 130) or in a third party computing system. A questionnaire may include one or more sections, with each section including one or more subsections. Each subsection may include one or more questions for an entity (e.g., affiliate) directed to the entity's security practices. A response may be input for each question of a custom questionnaire. Each response may indicate a state (e.g., a self-evaluation) of the entity's (e.g., affiliate's) cyber security practices associated with the question. In some embodiments, a response to a question may include a discrete, preconfigured response. For example, a response to a question may include a selection of a response from five selectable, preconfigured responses. In some embodiments, a response may include a configurable response, where a user may input or otherwise configure a response to the question. As described herein, a question may be mapped to one or more risk vectors with corresponding risk vector ratings or grades. In some embodiments, a question may not be mapped to one or more risk vectors.

In some embodiments, an affiliate may complete a questionnaire and send the completed questionnaire to the entity. An affiliate may complete the questionnaire within the risk management tool 100 and/or within a third party computing system. The completed questionnaire may be received by the entity at the risk management tool 100 (e.g., via a computer network) or via a third party computing system. The completed questionnaire may be available via the user interface 150 and may be stored by the questionnaire management module 130, the assessment report generation module 140, or a third party computing system. A user may view the completed questionnaire at the user interface 150. In some embodiments, the assessment report generation module 140 may generate an assessment report based on the completed questionnaire. The assessment report may include the questionnaire with each of the questions and the corresponding responses (e.g., selected responses and/or configured responses). The assessment report may include an indication of the risk vector(s) mapped each applicable question and the corresponding risk ratings or grades for the risk vectors. The assessment report may include weighted risk vector scores for applicable questions as described herein. Questions having weighted risk vector scores less than or equal to the configured threshold may be flagged in the assessment report as described herein. The questions having weighted risk vector scores less than or equal to the configured threshold may include a flag indication. The assessment report may include one or more characteristics as described below with respect to FIGS. 5A and 5B.

In some embodiments, the assessment report may include risk vector ratings or grades determined based on security characteristics of each of the affiliates (e.g., as described herein with respect to step 210 of the method 200). By determining risk vector ratings or grades from the security characteristics of an affiliate, an entity may validate an affiliate's responses to the questionnaire. If a sufficiently large discrepancy exists between a response to a question and the risk vector rating(s) or grade(s) mapped to the question, an entity may contact and/or investigate an affiliate. In some cases, based on a sufficiently large discrepancy, the entity may modify its risk management protocols with regard to the affiliate.

In some embodiments, an assessment report may include one or more filters. The one or more filters may include filtering the assessment report by section, subsection, flagged responses, risk vector, risk vector rating or grade, and/or questions that are mapped to risk vectors. In some embodiments, an assessment report may be generated in a comma-separated value (CSV) format for review at the user interface 150 or in a third party application. A user may download an assessment report from the risk management tool 100 in a .csv format or any other suitable format for further review external to the risk management tool 100.

Figure 4:
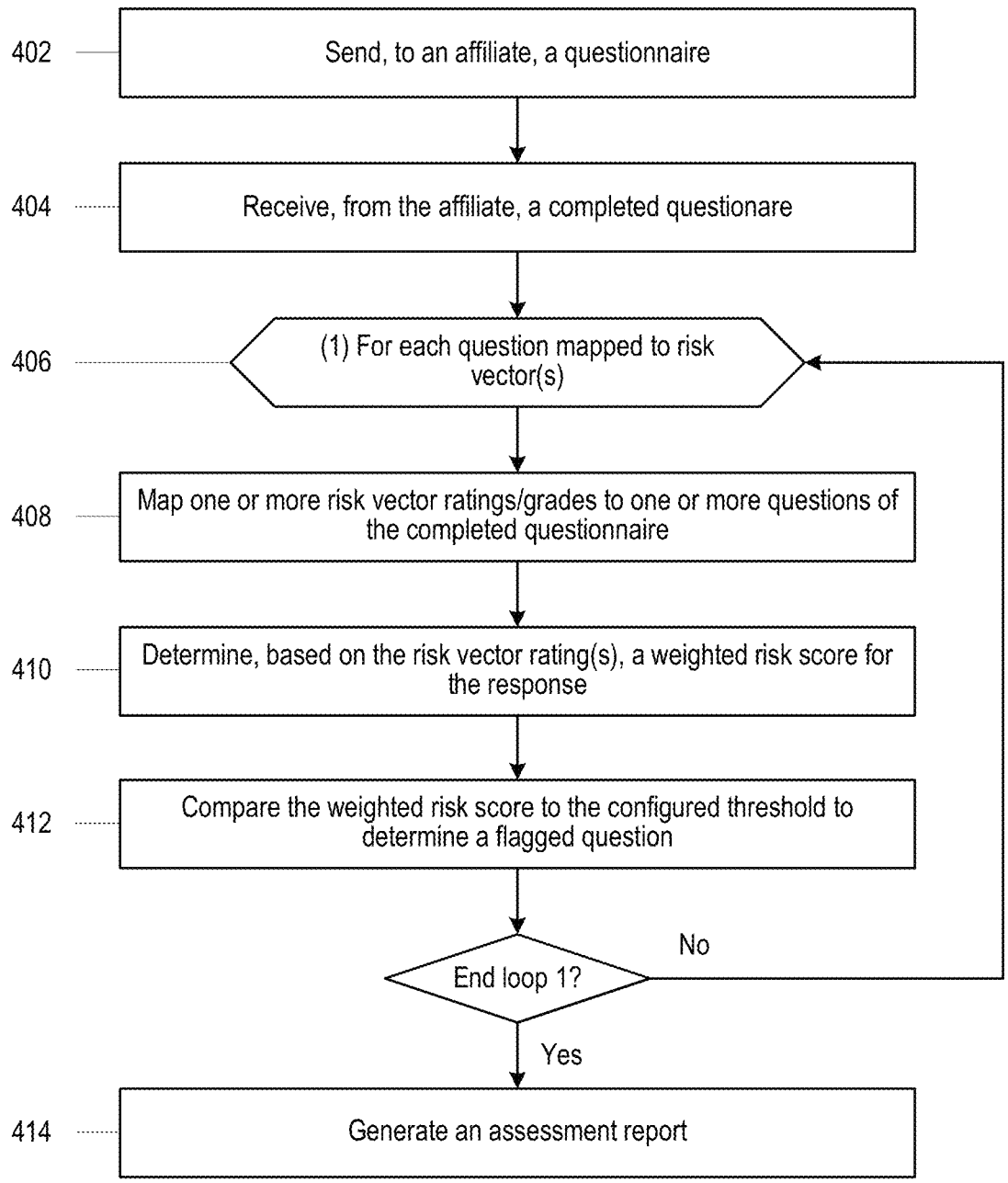
FIG. 4 depicts a flowchart of an entity-specific cybersecurity risk assessment method, according to some embodiments.

FIG. 4 depicts an entity-specific cybersecurity risk assessment method 400, according to some embodiments. In the example of FIG. 4, the risk management method 400 includes steps 402-416, which are described below. In some embodiments, the risk assessment method 400 is performed, for example, by a risk management tool 100 (e.g., by a risk vector rating module 120, a questionnaire management module 130, and/or an assessment report generation module 140 of the risk monitoring tool 100). The risk assessment method 400 may be suitable for assessing an entity's affiliate based on sending a questionnaire to the affiliate. As indicated by the loop header 406, steps 408, 410, and 412 of the method 400 may be performed for question of a questionnaire that is mapped to one or more risk vectors. For simplicity, the following paragraphs describe steps 408, 410, and 412 with reference to a single question of a questionnaire. However, one of ordinary skill in the art will appreciate that steps 408, 410, and 412 each may be performed in parallel by the risk management tool 100.

In step 402 of the method 400, an entity may send a questionnaire to an affiliate. In some cases, the entity may send the questionnaire to the affiliate via the risk management tool 100 by interacting with the user interface 150. In some cases, the entity may cause a third party computing system to send the questionnaire to the affiliate. The questionnaire may be sent to a computing system associated with the affiliate via a network. In an example, the questionnaire may be sent to a third party computing system that is accessible by the affiliate. In some embodiments, the questionnaire may be selected based on mapping an affiliate to an action plan by performing a risk management method 200 as described above with reference to FIG. 2. The questionnaire may be a full questionnaire or a partial questionnaire, where a partial questionnaire includes a subset of questions included in a full questionnaire. The questionnaire may be any one of a standard free assessment questionnaire, a commercial assessment questionnaires, or a customized questionnaire. The questionnaire may be include one or more characteristics as described herein.

In step 404 of the method 400, the entity may receive a completed questionnaire from the affiliate. In some cases, the entity may receive the completed questionnaire from the affiliate via the risk management tool 100 by interacting with the user interface 150. In some cases, the entity may receive the completed questionnaire from the affiliate via a third party computing system. The completed questionnaire may be sent to the risk management tool 100 via a computing system associated with and/or accessible by the affiliate via a network. The completed questionnaire may include one or more responses to the one or more included questions.

With respect to each question that is mapped to one or more risk vectors, in step 408 of the method 400, the risk management tool 100 may map one or more risk vector ratings or grades to a question of the completed questionnaire. In some embodiments, a question in the questionnaire may be mapped to one or more risk vectors. In some embodiments, a question in the questionnaire may not be mapped to one or more risk vectors. Elements of the risk management module 100 (e.g., the risk vector rating module 120, the questionnaire management module 130, or the assessment report generation module 140) may store the mappings of the one or more risk vector ratings to the one or more questions.

In step 410 of the method 400, the risk management tool 100 may determine a weighted risk score for the question. In some embodiments, the risk management tool 100 may determine a weighted risk score as described herein with respect to Table 1, Table 2, and Equation 1. In some embodiments, the risk management tool 100 may determine a weighted risk score according to alternative techniques. For a response mapped to one risk vector rating, the weighted risk score may be equivalent to the mapped risk vector rating. For a response mapped to more than one risk vector rating, the weighted risk score may be determined based on a weighted combination of the risk vector ratings and risk vector weights.

In step 412 of the method 400, the risk management tool 100 may compare the weighted risk vector score to a configured threshold to determine whether to flag the question. If the weighted risk vector score is greater than the configured threshold, the risk management tool 100 may not flag the question. If the weighted risk vector score is less than or equal to the configured threshold, the risk management tool 100 may flag the question. Flagging a question may indicate that a question requires further attention from the entity due to poor and/or risky cyber security practices of an affiliate indicated by the question. The configured threshold may be selected by an entity (e.g., via the user interface 150) based on their risk tolerance. A higher configured threshold may cause fewer responses to be flagged by the risk management tool 100, while a lower configured threshold may cause more responses to be flagged by the risk management module In step 414 of the method 400, the risk management tool 100 may generate an assessment report. In some embodiments, the risk management tool 100 may generate the assessment report based on receiving an input from a user at the user interface 150. A user may review the assessment report (e.g., in the user interface 150 or in an exported CSV file) using one or more filters as described herein. A user may review risk vector ratings or grades for an affiliate and an affiliate's responses to the questionnaire, such that the user may validate an affiliate's responses to the questionnaire as described herein.

Figure 5A:
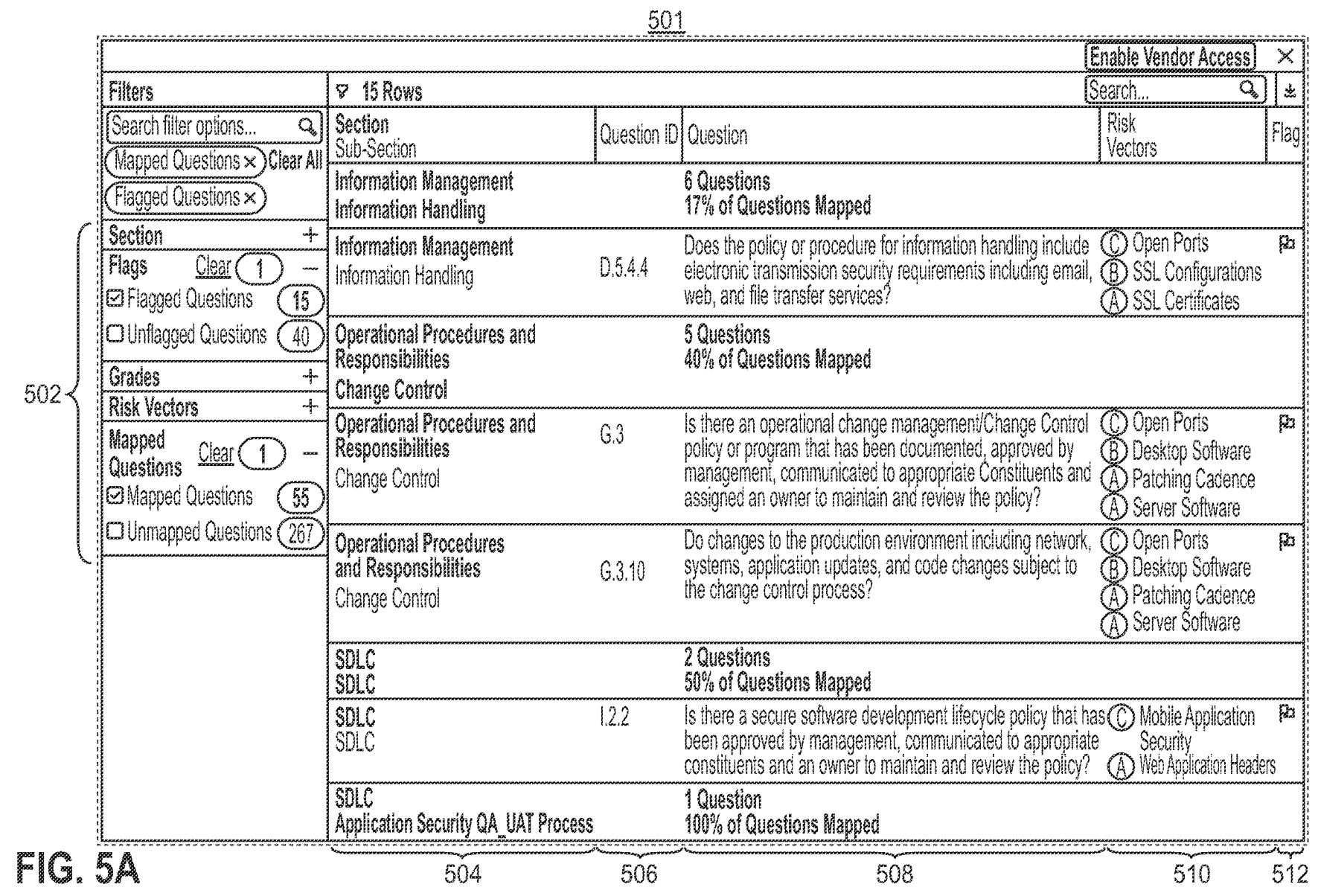

As described herein, the risk management tool 100 may provide a user interface 150. In some embodiments, an assessment report may be reviewed in the user interface 150 of the risk management tool or as a part of an application programming interface (API) included in a third party computing system. Referring to FIGS. 5A and 5B, non-limiting embodiments of a user interface (UI) component 501 for cybersecurity risk assessment are illustrated. In particular, FIGS. 5A and 5B show an example of a UI component 501 for a generated assessment report. The UI component 501 may be displayed via the user interface 150. The UI component 501 may provide a visual representation of a risk assessment report generated from a questionnaire completed by an entity's affiliate. The UI component 501 may include visual representations of configurable filters 502, sections and subsections 504, question identifiers (IDs) 506, questions 508, risk vectors and risk vector grades 510 mapped to each question 508, and flags 512, and context information 514 associated with a question 508. As shown in FIG. 5B, a question 508 may be selected in the UI component 501, which may cause the UI component 501 to display a section and subsection 504 associated with the question 508, a question ID 506, the question 508, risk vectors and risk vector grades 510, a flag 512, and context information 514 for the question 508.

Security Ratings of Entities

In some embodiments, the security characteristics of an entity's network(s) can be evaluated to assess the entity's cybersecurity states, and/or how the addition or selective removal of affiliates having relationships with the entity may impact a security rating. Specifically, the security characteristics can be evaluated to determine the entity's security rating based on changes to an entity's affiliates and/or risk vector ratings or grades associated with an entity's affiliates, enabling an entity to identify potential areas of risk associated with certain affiliates. The entity's security rating and an affiliate's security rating can be provided to the entity as a measure of that entity's risk of security breaches and/or past security record.

In various embodiments, networks can be characterized for each individual entity. In some embodiments, in parent-child entity relationships (e.g., parent company and subsidiary company), an IP address is attributed to a parent entity's subsidiary and the parent entity. For security ratings purposes, an IP address and/or computer network would be associated with both the entity and any other entities that are parents of that entity.

Examples of determining and/or evaluating the security characteristics of entities and associated IP addresses, and determining security ratings and risk vector ratings/grades of entities based on the security characteristics can be found in at least U.S. Publication No. 2016/0205126 published on Jul. 14, 2016 and titled "Information Technology Security Assessment System," U.S. Pat. No. 9,973,524 issued on May 15, 2018 and titled "Information Technology Security Assessment System," U.S. Pat. No. 9,830,569 issued on Nov. 28, 2017 and titled "Security Assessment Using Service Provider Digital Asset Information," and U.S. patent application Ser. No. 16/514,771 filed on Jul. 17, 2019 and titled "Systems and methods for generating security improvement plans for entities", all of which are incorporated herein by reference in their entireties.

In some embodiments, determining security risk of entities uses externally observable information as proxies for (i) the effectiveness of the overall security performance of the policies and controls that entity implements and exercises and/or (ii) the vulnerability of the entity to security risk. This externally observable information can be categorized into observable subject areas, or "risk vectors" as described herein, which can each be independently determined and/or characterized. For example, one possible proxy for entity vulnerability is the number of entity-owned IP addresses which are reported by third parties to be malicious. The greater the number of reports, the more likely the particular entity was vulnerable and had been compromised.

In some embodiments, received data for an entity can include two or more subject areas (e.g., of those listed above in the section titled "Some Embodiments of Cybersecurity Risk Assessment Method"). In some cases, determining the security rating for an entity can include determining the relationship between the first subject area and the second subject area. This relationship can be stored in a database and accessed for use. For example, the number of botnet infections of an entity may be correlated with the number of potentially exploited devices associated with the entity. This correlation can be stored and referenced in the future. In some embodiments, the security characteristic of an entity is associated with, related to, or equal to the security rating of that entity (e.g., on a scale from 250 to 900, as provided by BitSight Technologies, Inc., Boston, MA).

In some embodiments, to compute the security ratings for an entity, obtained data pertaining to the IT assets owned by that entity may be aggregated. For example, IT assets can include the IP addresses controlled by the entity and obtained data can include the activity associated with those IP addresses. To determine externally observable information about IP address-based assets, one or more IP addresses can be associated with an entity. The data may be processed to determine additional information. For example, processing may yield a list of IP addresses for an entity that has demonstrated suspicious or malicious behavior or fails to follow best security practices for the given reference data point. Similar methods can be used for other types of assets, e.g., domain-based assets, or other information for which an asset can be determined to be associated to an organization. Using these techniques, information about that asset can be associated with the entity.

The exemplary security ratings systems and methods may be configured to account for differences in data sources and types. Given each data source's potentially unique insight of an entity, there can be two or more techniques used to take advantage of the respective data. Data source-specific modeling techniques may be applied to some or all of the data sources to demonstrate feasibility and validate the approach for each data source and modeling technique.

In some embodiments, the combination of two or more vectors may produce a security rating that reflects the effectiveness of an entity's security efforts. The determination of individual vectors and the overall security rating can be influenced by security best-practices as promoted by standardized and accepted cybersecurity frameworks. In some embodiments, evidence of security compromise can be used to understand the specific impact the individual vectors have on the security rating of the entity. For instance, correlation between sources of externally observed information can be used to determine the impact of vectors. For example, the vectors representing evidence of compromised workstations (owned or controlled by an entity) may represent a significant portion of the entity's ability to implement security controls correctly, and thus may influence the entity's security rating more than other types of information.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 6:
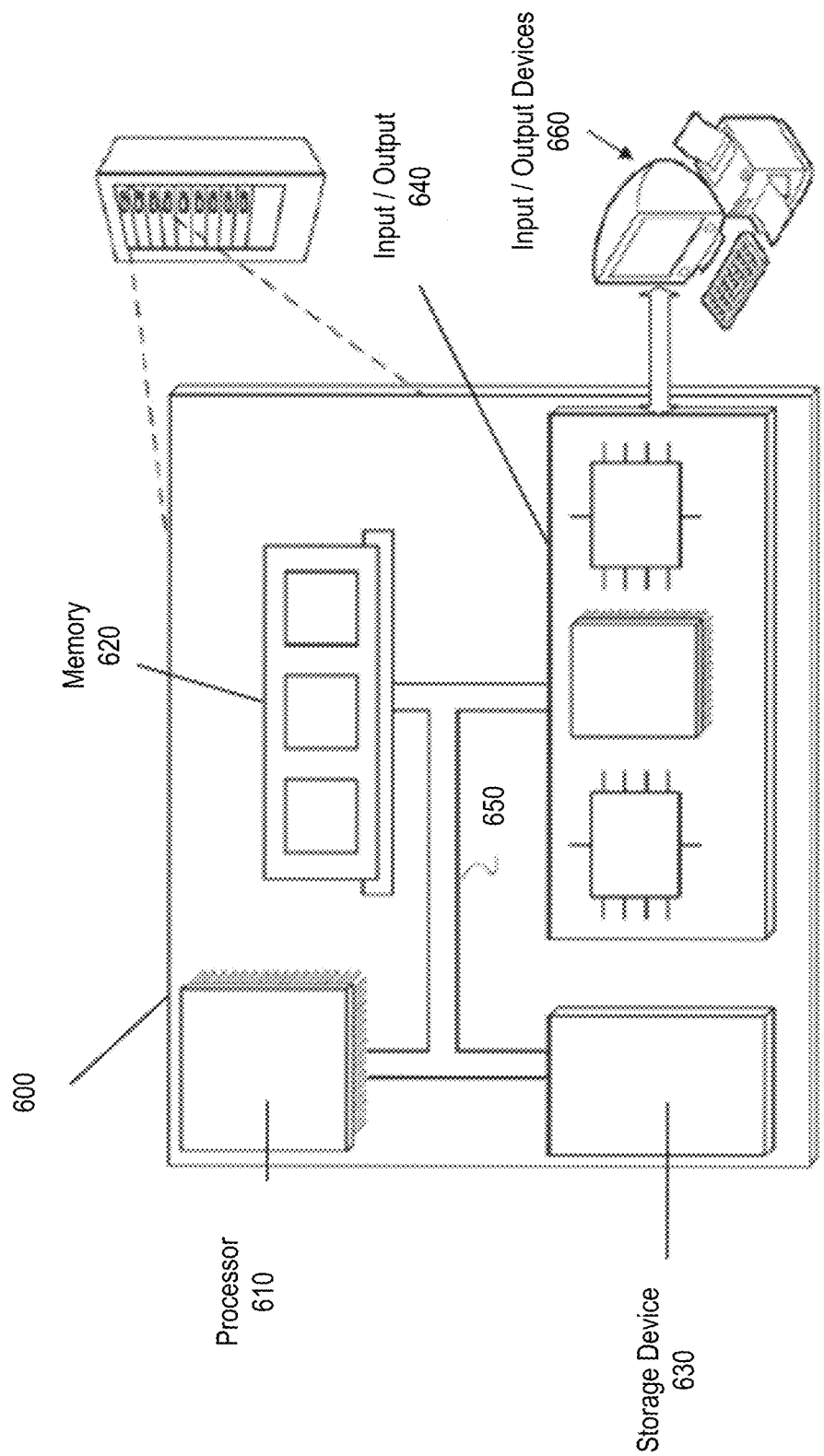
FIG. 6 is a block diagram of an example computer system that may be used in implementing the technology described herein.

FIG. 6 is a block diagram of an example computer system 600 that may be used in implementing the technology described in this document. General-purpose computers, network appliances, mobile devices, or other electronic systems may also include at least portions of the system 600. The system 600 includes a processor 610, a memory 620, a storage device 630, and an input/output device 640. Each of the components 610, 620, 630, and 640 may be interconnected, for example, using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630.

The memory 620 stores information within the system 600. In some implementations, the memory 620 is a non-transitory computer-readable medium. In some implementations, the memory 620 is a volatile memory unit. In some implementations, the memory 620 is a non-volatile memory unit.

The storage device 630 is capable of providing mass storage for the system 600. In some implementations, the storage device 630 is a non-transitory computer-readable medium. In various different implementations, the storage device 630 may include, for example, a hard disk device, an optical disk device, a solid-date drive, a flash drive, or some other large capacity storage device. For example, the storage device may store long-term data (e.g., database data, file system data, etc.). The input/output device 640 provides input/output operations for the system 600. In some implementations, the input/output device 640 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 660. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 630 may be implemented in a distributed way over a network, such as a server farm or a set of widely distributed servers, or may be implemented in a single computing device.

Although an example processing system has been described in FIG. 6, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
   selecting, for an affiliate of a plurality of affiliates of an entity, a cybersecurity action plan, wherein the selection is based on a combination of a cybersecurity criticality tier, one or more risk vector ratings for one or more risk vectors, and a security rating for the affiliate, wherein the cybersecurity criticality tier is selected from a set of cybersecurity criticality tiers, and wherein the one or more risk vector ratings are derived from externally-observable information for IP address-based assets of the affiliate;
   sending, to the affiliate, one or more questions, wherein at least one question of the one or more questions is mapped to at least one risk vector and at least one risk vector rating for the at least one risk vector;
   receiving, from the affiliate, a response to each of the one or more questions;
   for each question mapped to at least one risk vector rating:
      determining a risk score for the question based on a weighted combination of the at least one risk vector rating and a weight for the at least one risk vector rating;
      determining, based on a comparison of the risk score to a threshold, an indication of whether the question is indicative of a cybersecurity risk; and
      when the risk score is less than or equal to the threshold, assigning a flag to the question to indicate the question is indicative of a cybersecurity risk; and
   causing display of an assessment report configured to show an assessment of cybersecurity risk of the affiliate, wherein the assessment report comprises the one or more questions, the response to each of the one or more questions, the at least one risk vector rating for each question mapped to the at least one risk vector, and the flag displayed with each question that is assigned the flag.

2. The computer-implemented method of claim 1, wherein each risk vector rating is indicative of a state of the respective risk vector of the affiliate.

3. The computer-implemented method of claim 1, wherein each question is indicative of a cybersecurity risk of the affiliate.

4. The computer-implemented method of claim 1, wherein the one or more risk vectors comprise at least one of:
   an amount of capital investment by the affiliate;
   a measure of employee training for the affiliate;
   an amount of the affiliate's budget for security;
   a number of lost records and/or sensitivity of information in the lost records in a data breach of a computer system associated with the affiliate;
   a number and/or type of service of open ports of a computer network associated with the affiliate;
   a number and/or severity of botnet infection instances of a computer system associated with the affiliate;
   an evaluation of file sharing traffic originating from a computer network associated with the affiliate;
   a number of spam propagation instances originating from a computer network associated with the affiliate;
   a number of malware servers associated with the affiliate;
   a number of potentially exploited devices associated with the affiliate; and
   a number of hosts authorized to send emails on behalf of each domain associated with the affiliate.

5. The computer-implemented method of claim 1, wherein the one or more risk vector ratings are numerical.

6. The computer-implemented method of claim 1, wherein each of the risk vectors comprises a respective risk vector type of a plurality of risk vector types.

7. The computer-implemented method of claim 6, wherein the plurality of risk vector types comprise at least one of a data breaches type, an open ports type, a botnet infections type, a potentially exploited device type, a file sharing type, and an other type.

8. The computer-implemented method of claim 7, wherein each of the plurality of risk vector types corresponds to a respective one of a plurality of weights, the plurality of weights being numerical and further comprising the weight for the at least one risk vector rating.

9. The computer-implemented method of claim 1, wherein the risk score for each question is calculated by dividing a sum of a multiplication of each of the risk vector ratings mapped to the question and the weights of each of the risk vector ratings by a sum of the weights of each of the risk vector ratings.

10. The computer-implemented method of claim 1, wherein the cybersecurity criticality tier is a level of criticality of a relationship between the entity and the affiliate.

11. A system for accelerating cybersecurity assessments, the system comprising:
   one or more processors; and
   a memory coupled with the one or more processors wherein the one or more processors executes a plurality of modules stored in the memory and wherein the plurality of modules comprises:
      a tier recommendation module that when executed selects, for an affiliate of a plurality of affiliates of an entity, a cybersecurity action plan, wherein the selection is based on a combination of a cybersecurity criticality tier, one or more risk vector ratings for one or more risk vectors, and a security rating for the affiliate, wherein the cybersecurity criticality tier is selected from a set of cybersecurity criticality tiers, and wherein the one or more risk vector ratings are derived from externally-observable information for IP address-based assets of the affiliate;
      a questionnaire management module that when executed provides, to the affiliate, one or more questions, wherein at least one question of the one or more questions is mapped to at least one risk vector and at least one risk vector rating for the at least one risk vector;
      a risk vector rating module that when executed for each question mapped to at least one risk vector rating:
         determines a risk score for the question based on a weighted combination of the at least one risk vector rating a weight for the at least one risk vector rating;
         determines, based on a comparison of the risk score to a threshold, an indication of whether the question is indicative of a cybersecurity risk; and when the risk score is less than or equal to the threshold, assigns a flag to the question to indicate the question is indicative of a cybersecurity risk; and an assessment report generation module that when executed generates and causes display of an assessment report including an assessment of cybersecurity risk of the affiliate, wherein the assessment report comprises the one or more questions, a response to each of the one or more questions, the at least one risk vector rating for each question mapped to the at least one risk vector, and the flag displayed with each question that is assigned the flag.

12. The system of claim 11, wherein each risk vector rating is indicative of a state of the respective risk vector of the affiliate.

13. The system of claim 11, wherein the cybersecurity criticality tier is a level of criticality of a relationship between the entity and the affiliate.

14. The system of claim 11, wherein the one or more risk vectors comprise at least one of:
an amount of capital investment by the affiliate;
a measure of employee training for the affiliate;
an amount of the affiliate's budget for security;
a number of lost records and/or sensitivity of information in the lost records in a data breach of a computer system associated with the affiliate;
a number and/or type of service of open ports of a computer network associated with the affiliate;
a number and/or severity of botnet infection instances of a computer system associated with the affiliate;
an evaluation of file sharing traffic originating from a computer network associated with the affiliate;
a number of spam propagation instances originating from a computer network associated with the affiliate;
a number of malware servers associated with the affiliate;
a number of potentially exploited devices associated with the affiliate; and
a number of hosts authorized to send emails on behalf of each domain associated with the affiliate.

15. The system of claim 11, wherein the one or more risk vector ratings are is a numerical-rating.

16. The system of claim 11, wherein each of the risk vectors comprises a respective risk vector type of a plurality of risk vector types.

17. The system of claim 16, wherein the plurality of risk vector types comprise at least one of a data breaches type, an open ports type, a botnet infections type, a potentially exploited device type, a file sharing type, and an other risk vector-type.

18. The system of claim 17, wherein each of the plurality of risk vector types corresponds to a respective one of a plurality of weights, the plurality of weights being numerical and further comprising the weight for the at least one risk vector rating.

19. The system of claim 11, wherein the risk score for each question is calculated by dividing a sum of a multiplication of each of the risk vector ratings mapped to the question and the weights of each of the risk vector ratings by a sum of the weights of each of the risk vector ratings.

20. The system of claim 11, wherein each question is indicative of a cybersecurity risk of the affiliate.

* * * * *